(12) United States Patent
Ikkaku et al.

(10) Patent No.: US 11,308,082 B2
(45) Date of Patent: Apr. 19, 2022

(54) ANALYSIS APPARATUS, ANALYSIS METHOD, AND STORAGE MEDIUM

(71) Applicant: FUJITSU LIMITED, Kawasaki (JP)

(72) Inventors: Kento Ikkaku, Kawasaki (JP);
Kazuhito Matsuda, Kawasaki (JP);
Norinao Kouma, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 61 days.

(21) Appl. No.: 17/000,408

(22) Filed: Aug. 24, 2020

(65) Prior Publication Data

US 2021/0064606 A1    Mar. 4, 2021

(30) Foreign Application Priority Data

Aug. 30, 2019 (JP) .............................. JP2019-158342

(51) Int. Cl.
*G06F 16/245* (2019.01)

(52) U.S. Cl.
CPC .................................. *G06F 16/245* (2019.01)

(58) Field of Classification Search
CPC .................................................... G06F 16/245
See application file for complete search history.

(56) References Cited

U.S. PATENT DOCUMENTS

| | | | |
|---|---|---|---|
| 2016/0343147 A1* | 11/2016 | Nukaga | ................ G06K 9/4671 |
| 2018/0349416 A1* | 12/2018 | Circlaeys | .............. G06F 16/335 |
| 2018/0365977 A1 | 12/2018 | Inoue et al. | |

FOREIGN PATENT DOCUMENTS

| | | |
|---|---|---|
| JP | 2017-130041 A | 7/2017 |
| JP | 2018-11122 A | 1/2018 |
| WO | 2017/098866 A1 | 6/2017 |

* cited by examiner

*Primary Examiner* — Alicia M Willoughby
(74) *Attorney, Agent, or Firm* — Fujitsu Patent Center

(57) ABSTRACT

An analysis method includes acquiring target data collected at edges; determining first analysis target satisfying a first condition, and specifying a first detection position indicating a position at which the first analysis target is detected at the edges and a first detection time; calculating a correlation coefficient of the feature amount; specifying a first range of the first detection position and a second range of the first detection time of the analysis target for which the correlation coefficient satisfies a predetermined relationship; determining second analysis target satisfying a second condition, and specifying a second detection position and a second detection time; determining whether the analysis target in which the second detection position is included in the first range and the second detection time; and acquiring any one of the analysis target from the edges when it is determined that the analysis target is included.

9 Claims, 27 Drawing Sheets

FIG. 22

| ITEM NUMBER | EDGE ID | DETECTION LATITUDE | DETECTION LONGITUDE | DETECTION TIME |
|---|---|---|---|---|
| 1 | E135 | 35.680 | 139.767 | 12:02:14 |
| 2 | E046 | 35.683 | 139.765 | 12:02:29 |
| 3 | E352 | 35.668 | 139.781 | 12:02:42 |
| 4 | E135 | 35.679 | 139.766 | 12:02:45 |
| 5 | E135 | 35.681 | 139.765 | 12:02:12 |
| 6 | E319 | 35.691 | 139.765 | 12:02:58 |
| 7 | E143 | 35.689 | 139.752 | 12:02:12 |

FIG. 23

| DETECTION LATITUDE | DETECTION LONGITUDE | DETECTION TIME |
|---|---|---|
| 35.679-35.683 | 139.765-139.767 | 33 |

FIG. 24

| DETECTION LATITUDE | DETECTION LONGITUDE | DETECTION TIME |
|---|---|---|
| 35.677-35.685 | 139.763-139.769 | 37 |

FIG. 27

| ITEM NUMBER | EDGE ID | DETECTION LATITUDE | DETECTION LONGITUDE | DETECTION TIME |
|---|---|---|---|---|
| 1 | E321 | 35.682 | 139.766 | 15:33:03 |
| 2 | E023 | 35.679 | 139.767 | 15:33:51 |
| 3 | E321 | 35.666 | 139.780 | 15:33:28 |
| 4 | E146 | 35.681 | 139.765 | 15:33:11 |

ANALYSIS APPARATUS, ANALYSIS METHOD, AND STORAGE MEDIUM

CROSS-REFERENCE TO RELATED APPLICATION

This application is based upon and claims the benefit of priority of the prior Japanese Patent Application No. 2019-158342, filed on Aug. 30, 2019, the entire contents of which are incorporated herein by reference.

FIELD

The embodiments discussed herein are related to an analysis apparatus, an analysis method, and a storage medium.

BACKGROUND

For example, business entities providing services to users (also simply referred to as "business entities" hereinafter) construct and operate information processing systems for providing services to the users. For example, the business entity constructs an information processing system that analyzes analysis target data (for example, moving image data captured by a camera, hereinafter also simply referred to as an analysis target) acquired at each of a plurality of edges.

In such an information processing system, a management apparatus that analyzes analysis target data (hereinafter, also simply referred to as a management apparatus) acquires analysis target data that matches a condition from each edge when receiving the condition from a user, for example. The management apparatus performs analysis based on the acquired analysis target data. Accordingly, the information processing system may analyze the analysis target data while suppressing the amount of communication between each edge and the management apparatus.

In the information processing system as described above, the management apparatus acquires in advance, for example, information (hereinafter, also referred to as a feature amount) indicating a feature of the analysis target data acquired at each edge. The management apparatus specifies an edge from which the analysis target data is acquired based on the acquired feature amount. For example, the management apparatus creates a cluster for each edge having a correlation between feature amounts and specifies an edge from which analysis target data is acquired for each created cluster. Thereafter, the management apparatus acquires the analysis target data from the specified edge when acquiring the analysis target data that matches the condition received from the user. Accordingly, the information processing system may suppress analysis target data having redundant contents from being acquired from a plurality of edges, and may further suppress the amount of communication between each edge and the management apparatus. For example, Japanese Laid-open Patent Publication No, 2017-130041, International Publication Pamphlet No. 2017/098866, Japanese Laid-open Patent. Publication No. 2018-011122, and the like are disclosed as related art.

SUMMARY

According to an aspect of the embodiments, an analysis apparatus, includes a memory; and a processor coupled to the memory and the processor configured to: acquire a plurality of pieces of analysis target data collected at a plurality of edges, determine first analysis target data satisfying a first condition from among the plurality of pieces of analysis target data, and specifying a first detection position indicating a position at which each piece of the determined first analysis target data is detected at the plurality of edges and a first detection time indicating a time when each piece of the determined first analysis target data is detected at the plurality of edges by referring to a storage unit that stores meta information corresponding to the plurality of pieces of analysis target data; acquire a feature amount corresponding to each piece of the first analysis target data from the plurality of edges, calculate a correlation coefficient of the feature amount between respective pieces of analysis target data included in the first analysis target data; specify a first range of the first detection position and a second range of the first detection time of the analysis target data for which the calculated correlation coefficient satisfies a predetermined relationship, from among the first analysis target data, determine second analysis target data satisfying a second condition from among the plurality of pieces of analysis target data, and specifying a second detection position and a second detection time corresponding to the determined second analysis target data by referring to the storage unit, determine whether the specified analysis target data in which the specified second detection position is included in the first range and the specified second detection time corresponds to the second range is included in the second analysis target data, and acquire any one piece of the specific analysis target data from the plurality of edges when it is determined that the specified analysis target data is included.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 22 is a diagram illustrating a specific example of meta information;

FIG. 23 is a diagram illustrating a specific example of range information;

FIG. 24 is a diagram illustrating a specific example of the range information;

FIG. 27 is a diagram illustrating a specific example of the meta information.

DESCRIPTION OF EMBODIMENTS

For example, when each edge moves over time, a management apparatus is supposed to frequently update the configuration of the edge included in each cluster. Therefore, in the management apparatus, it is indispensable to acquire the feature amount from each edge at a high frequency, and it may not be possible to specify analysis target data to be acquired within an allowed time.

In view of the above, it is desirable to efficiently specify the analysis target data to be acquired.

Configuration of Information Processing System

Figure 1:
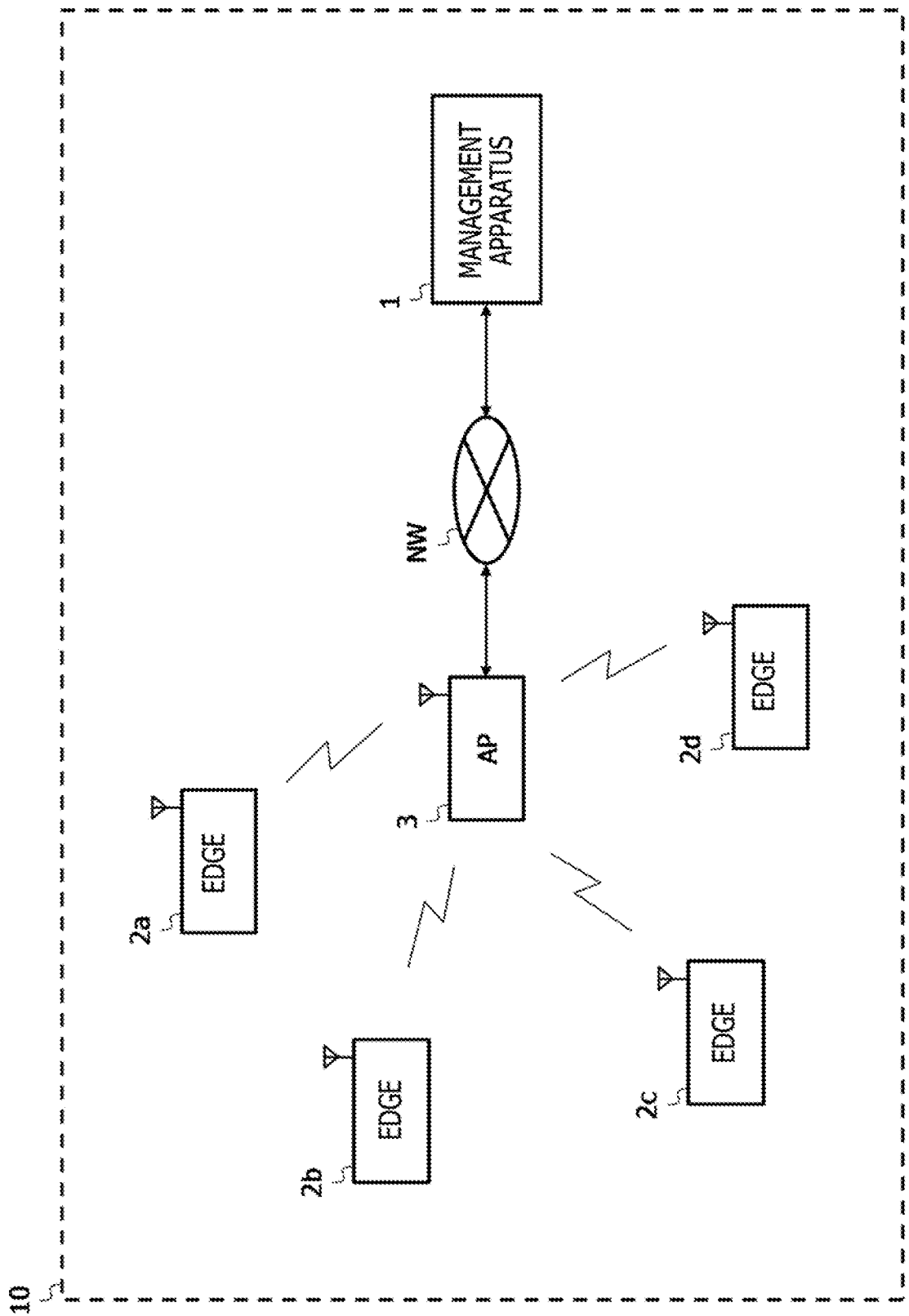
FIG. 1 is a diagram illustrating a configuration of an information processing system.

A configuration of the information processing system 10 will be described. FIG. 1 is a diagram illustrating the configuration of the information processing system 10.

As illustrated in FIG. 1, the information processing system 10 includes, for example, a management apparatus 1 (hereinafter, also referred to as an analysis target acquisition apparatus 1) and edges 2a, 2b, 2c, and 2d (hereinafter, collectively simply referred to as an edge 2) disposed over a cloud. Each edge 2 is, for example, a movable automobile, and is equipped with a camera (not illustrated) for capturing analysis target data. As illustrated in FIG. 1, each edge 2 accesses the management apparatus 1 by performing wired communication via a network NW and wireless communication via an access point 3, for example. Although a case in which four edges 2 (edges 2a, 2b, 2c, and 2d) are included will be described below, the information processing system 10 may include a number of edges 2 other than four.

In the example illustrated in FIG. 1, when receiving a condition from a user, the management apparatus 1 acquires analysis target data matching the condition from each edge 2 and analyzes the analysis target data. Hereinafter, a specific example when the management apparatus 1 analyzes the analysis target data will be described.

Specific Example when Analysis Target Data is Analyzed

Figure 2:
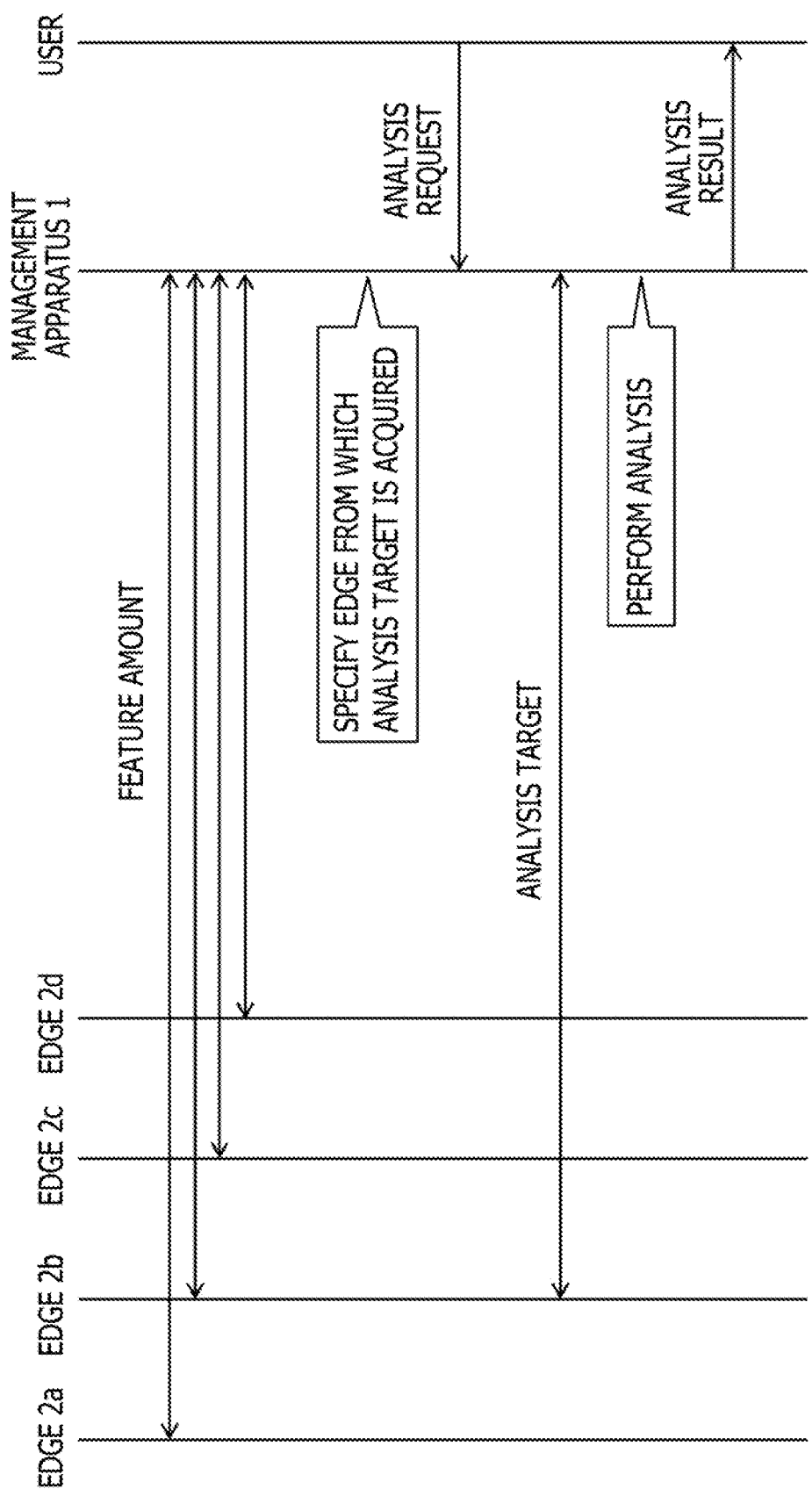
FIG. 2 is a sequence chart illustrating a specific example when a management apparatus analyzes analysis target data.

FIG. 2 is a sequence chart illustrating a specific example when the management apparatus 1 analyzes analysis target data.

The management apparatus 1 periodically acquires the feature amount of the analysis target data acquired at each edge 2 (edges 2a, 2b, 2c, and 2d). For example, the management apparatus 1 acquires the feature amount generated by each edge 2.

For example, the management apparatus 1 periodically acquires, for example, the number of persons captured in each piece of analysis target data as a feature amount. For example, the management apparatus 1 acquires, as the feature amount, the number of persons walking on a sidewalk among persons appearing in moving image data (analysis target data) captured by each edge 2 at an intersection. For example, the management apparatus 1 periodically specifies the edge 2 from which the analysis target data is acquired based on the acquired feature amount. For example, the management apparatus 1 creates a cluster for each edge 2 having a correlation between feature amounts and specifies each edge 2 from which analysis target data is acquired for each created cluster.

Thereafter, when an analysis request (hereinafter, also referred to as a condition) is received from an operation terminal (not illustrated) of the user, the management apparatus 1 transmits a transmission request for analysis target data matching the received condition to each of the edges 2 (the edge 2b in the example illustrated in FIG. 2) specified in advance. The edge 2 that has received the transmission request for the analysis target data transmits the analysis target data corresponding to the received transmission request to the management apparatus 1. The management apparatus 1 performs analysis based on the analysis target data received from each edge 2 and transmits an analysis result to the operation terminal of the user.

Accordingly, the information processing system 10 may suppress analysis target data having redundant contents from being acquired from a plurality of edges 2, and may further suppress the amount of communication between each edge 2 and the management apparatus 1.

For example, when each edge 2 moves over time, the management apparatus 1 is supposed to frequently update the configuration of the edge 2 included in each cluster. Therefore, in the management apparatus 1, it is indispensable to acquire the feature amount from each edge 2 at a high frequency, and it is not possible to specify analysis target data to be acquired within an allowed time.

Therefore, the management apparatus 1 according to the present embodiment determines analysis target data (hereinafter, also referred to as first analysis target data) satisfying a condition (hereinafter, also referred to as a first condition) corresponding to an analysis request designated by the user among a plurality of pieces of analysis target data detected at each edge 2 and specifies a position (hereinafter, also referred to as a detection position or a first detection position) at which each piece of the determined first analysis target data is detected at each edge 2 and a time detected at each edge 2 (hereinafter, also referred to as a detection time or a first detection time). The management apparatus 1 acquires the feature amount corresponding to each piece of the first analysis target data from the plurality of edges 2.

Subsequently, the management apparatus 1 respectively calculates a correlation coefficient of the feature amount between respective pieces of analysis target data included in the first analysis target data. The management apparatus 1 respectively specifies a range of the detection position (hereinafter, also referred to as a first range) and a range of the detection time (hereinafter, also referred to as a second range) of the analysis target data in which the calculated correlation coefficient satisfies a predetermined relationship among the first analysis target data.

Thereafter, the management apparatus 1 specifies a new detection position (hereinafter, also referred to as a second detection position) and a new detection time (hereinafter, also referred to as a second detection time) of the analysis target data (hereinafter, also referred to as second analysis target data) satisfying a condition (hereinafter, also referred to as a second condition) corresponding to another analysis request designated by the user, for example, among a plurality of pieces of analysis target data detected at each edge 2. The management apparatus 1 determines whether analysis target data (hereinafter, also referred to as third analysis target data or specific analysis target data) in which the specified new detection position is included in a first range and the specified new detection time corresponds to a second range is included in the second analysis target data. As a result, when it is determined that the third analysis target data is included, the management apparatus 1 acquires any one piece of the third analysis target data from the plurality of edges 2.

For example, the management apparatus 1 specifies the edge 2 from which analysis target data is acquired based on the relationship between the detection position and the detection time of each piece of analysis target data, instead of the relationship with other edges 2 included in the same cluster.

Accordingly, even when each edge 2 moves over time and the configuration of the edge included in each cluster is frequently updated, the management apparatus 1 may specify the analysis target data to be acquired without increasing the acquisition frequency of the feature amount from each edge 2. Therefore, the management apparatus 1 may specify the analysis target data to be acquired within an allowed time.

Hardware Configuration of Information Processing System

Figure 3:
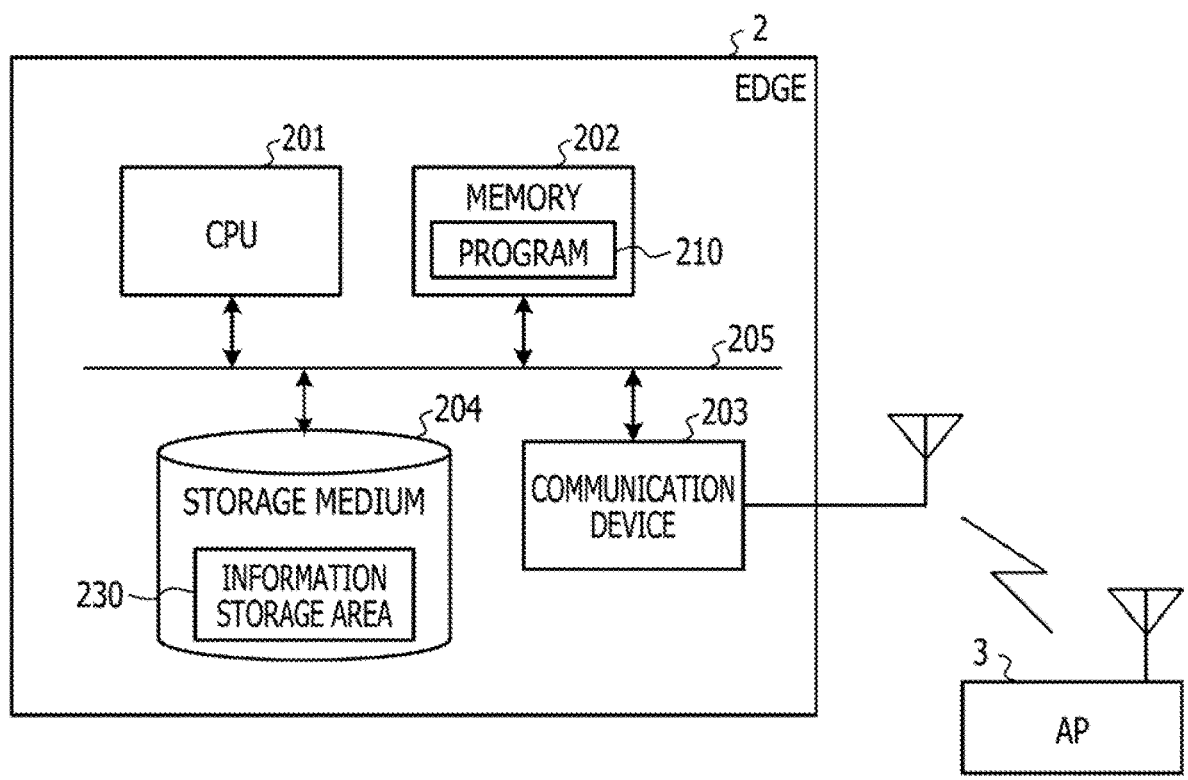
FIG. 3 is a diagram illustrating a hardware configuration of an edge.
Figure 4:
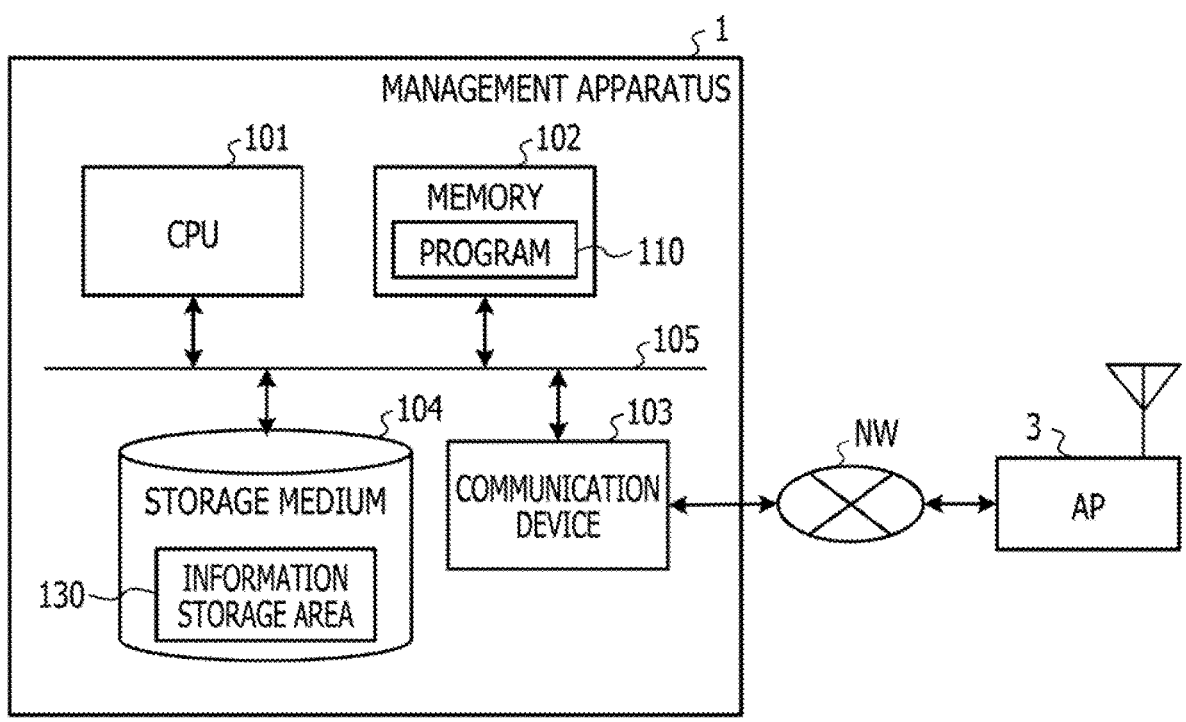
FIG. 4 is a diagram illustrating a hardware configuration of the management apparatus.

Next, a hardware configuration of the information processing system 10 will be described. FIG. 3 is a diagram illustrating the hardware configuration of the edge 2. FIG. 4 is a diagram illustrating the hardware configuration of the management apparatus 1.

First, the hardware configuration of the edge 2 will be described.

As illustrated in FIG. 3, the edge 2 includes a CPU 201 as a processor, a memory 202, a communication device 203, and a storage medium 204. These components are coupled to one another via a bus 205.

The storage medium 204 includes, for example, a program storage area (not illustrated) that stores a program 210 for performing processing of acquiring analysis target data (hereinafter, also referred to as analysis target acquisition processing). In addition, the storage medium 204 includes, for example, a storage unit 230 (hereinafter, also referred to as an information storage area 230) that stores information used when performing the analysis target acquisition processing. The storage medium 204 may be, for example, a hard disk drive (HDD) or a solid state drive (SSD).

The CPU 201 executes the program 210 loaded from the storage medium 204 to the memory 202 to perform the analysis target acquisition processing.

The communication device 203 performs wireless communication with the access point 3 by using, for example, Wi-Fi (registered trademark: Wireless Fidelity) or the like.

Next, the hardware configuration of the management apparatus 1 will be described.

As illustrated in FIG. 4, the management apparatus 1 includes a CPU 101 that is a processor, a memory 102, a communication device 103, and a storage medium 104. These components are coupled to one another via the bus 105.

The storage medium 104 includes, for example, a program storage area (not illustrated) that stores a program 110 for performing the analysis target acquisition processing. The storage medium 104 includes, for example, a storage unit 130 (hereinafter, also referred to as an information storage area 130) that stores information used when performing the analysis target acquisition processing. The storage medium 104 may be, for example, an HDD or an SSD.

The CPU 101 executes the program 110 loaded from the storage medium 104 to the memory 102 to perform the analysis target acquisition processing.

The communication device 103 performs wired communication with the access point 3 via the network NW, for example.

Functions of Information. Processing System

Figure 5:
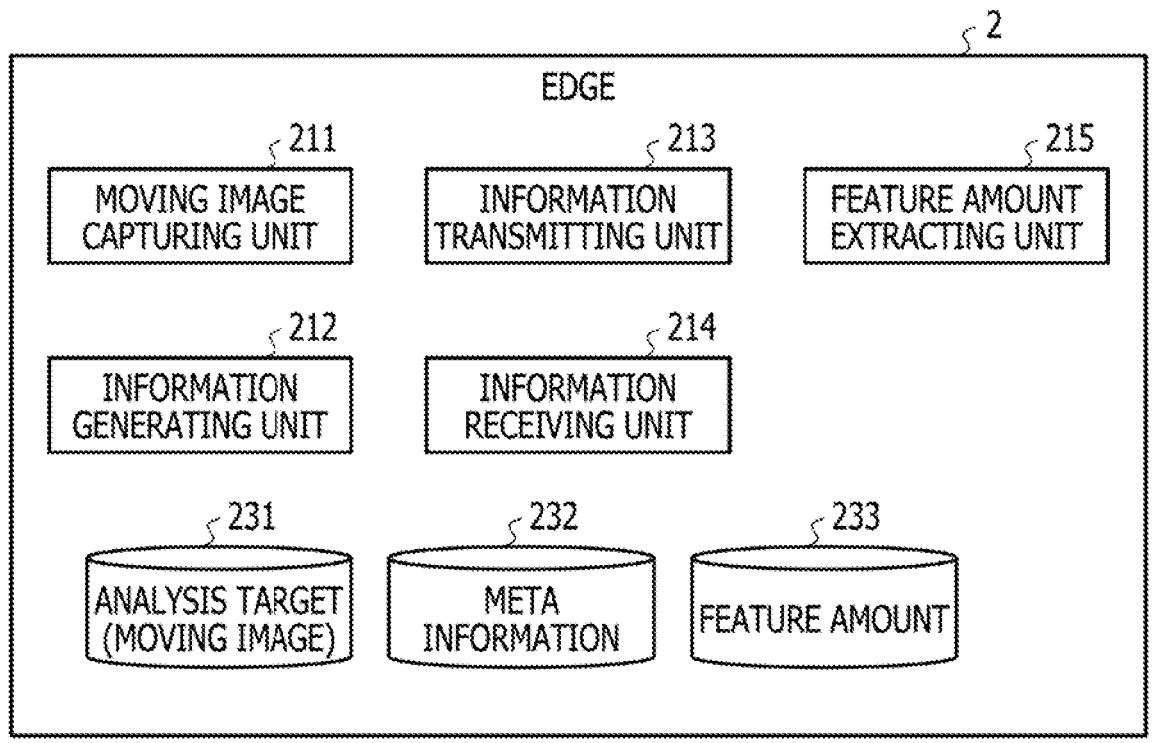
FIG. 5 is a block diagram of the functions of the edge.
Figure 6:
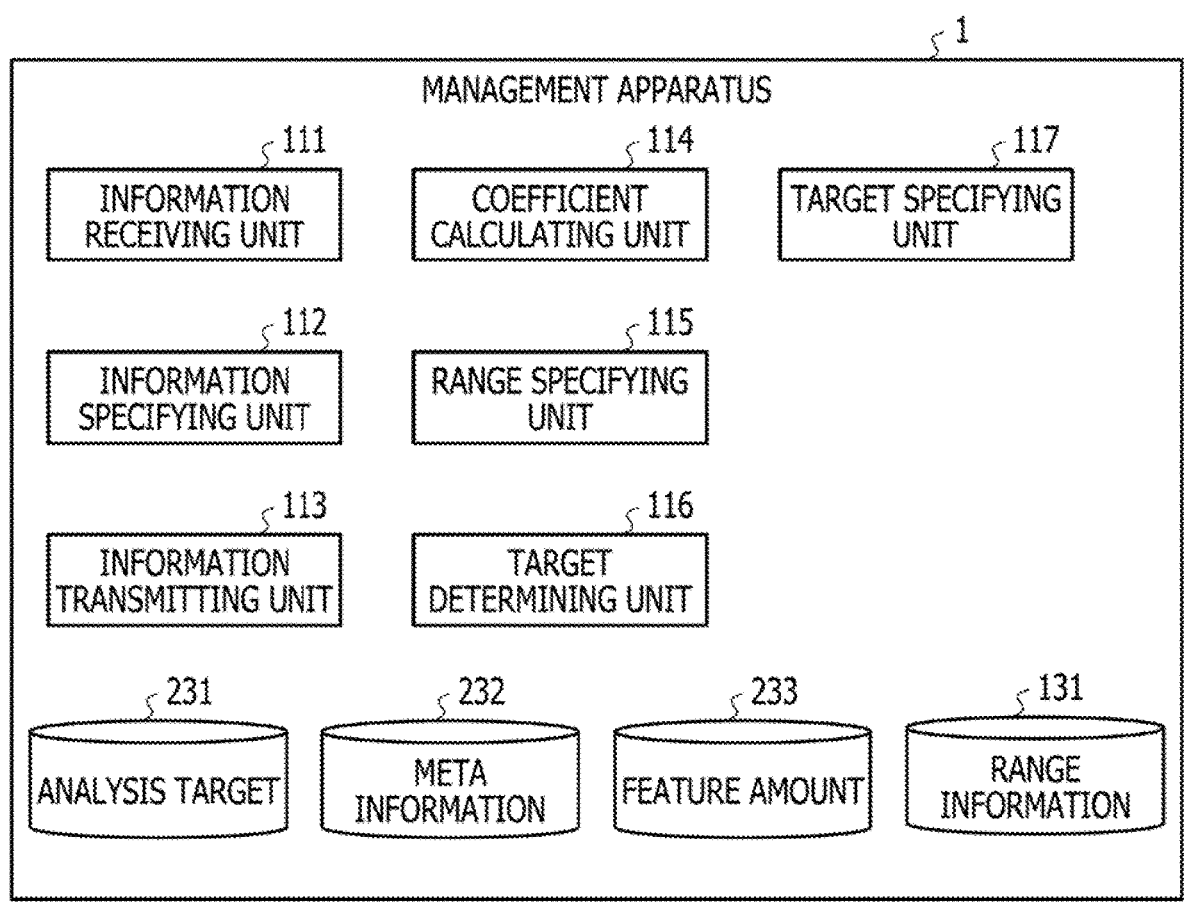
FIG. 6 is a block diagram off the functions of the management apparatus.

Next, functions of the information processing system 10 will be described. FIG. 5 is a block diagram of the functions of the edge 2. FIG. 6 is a block diagram of the functions of the management apparatus 1.

First, the block diagram of the function of the edge 2 will be described.

As illustrated in FIG. 5, for example, hardware such as the CPU 201 and the memory 202 and the program 210 organically cooperate with each other, whereby the edge 2 implements various functions including a moving image capturing unit 211, an information generating unit 212, an information transmitting unit 213, an information receiving unit 214, and a feature amount extracting unit 215.

For example, as illustrated in FIG. 5, the edge 2 stores analysis target data 231 (moving image data 231), meta information 232, and a feature amount 233.

The moving image capturing unit 211 acquires the analysis target data 231 captured by a camera (not illustrated) mounted on each edge 2 and stores the data in the information storage area 230.

The information generating unit 212 generates the meta information 232 including a detection position (for example, a detection latitude and a detection longitude) and a detection time of each piece of analysis target data 231. For example, the information generating unit 212 generates the meta information 232 corresponding to the analysis target data 231 in response to the acquisition of the analysis target data 231 by the moving image capturing unit 211. The information generating unit 212 stores the generated meta information 232 in the information storage area 230.

In response to the generation of the meta information 232 by the information generating unit 212, the information transmitting unit 213 transmits the meta information 232 to the management apparatus 1.

The information receiving unit 214 receives a transmission request for the feature amount 233 transmitted from the management apparatus 1.

In response to the reception of the transmission request for the feature amount 233 by the information receiving unit 214, the feature amount extracting unit 215 extracts the feature amount 233 corresponding to the transmission request. For example, the feature amount extracting unit 215 specifies the analysis target data 231 corresponding to the transmission request received by the information receiving unit 214 among the analysis target data 231 stored in the information storage area 230. The feature amount extracting unit 215 extracts the feature amount 233 from the specified analysis target data 231. Thereafter, the information transmitting unit 213 transmits the feature amount 233 extracted by the feature amount extracting unit 215 to the management apparatus 1.

The information receiving unit 214 receives a transmission request for the analysis target data 231 transmitted from the management apparatus 1. In this case, the information transmitting unit 213 transmits the analysis target data 231 corresponding to the transmission request received by the information receiving unit 214 among the analysis target data 231 stored in the information storage area 230 to the management apparatus 1.

Next, a block diagram of functions of the management apparatus 1 will be described.

As illustrated in FIG. 6, for example, hardware such as the CPU 101 and the memory 102, and the program 110 organically cooperate with each other, whereby the management apparatus 1 implements various functions including an information receiving unit 111, an information specifying unit 112, an information transmitting unit 113, a coefficient calculating unit 114, a range specifying unit 115, a target determining unit 116, and a target specifying unit 117. Hereinafter, the information receiving unit 111 and the information transmitting unit 113 are also collectively referred to as an information transmitting/receiving unit.

For example, as illustrated in FIG. 6, the management apparatus 1 stores the analysis target data 231, the meta information 232, the feature amount 233, and the range information 131 in the information storage area 130.

The information receiving unit 111 receives the meta information 232 transmitted from each edge 2. The information receiving unit 111 stores the received meta information 232 in the information storage area 130. The information receiving unit 111 receives, for example, a first condition input by the user via the operation terminal (not illustrated). The first condition includes, for example, a range of the detection position and a range of the detection time.

The information specifying unit 112 refers to the meta information 232 stored in the information storage area 130, specifies the analysis target data 231 (hereinafter, also referred to as first analysis target data 231a) corresponding to the first condition received by the information receiving unit 111, and further specifies the detection position and the detection time corresponding to the specified first analysis target data 231a.

The information transmitting unit 113 refers to the meta information 232 stored in the information storage area 130 and specifies the edge 2 holding each piece of the first analysis target data 231a specified by the information specifying unit 112. The information transmitting unit 113 transmits a transmission request for the feature amount 233 corresponding to the analysis target data 231 held by each edge 2 to each specified edge 2.

Thereafter, the information receiving unit 111 receives the feature amount 233 transmitted by the edge 2 to which the information transmitting unit 113 has transmitted the transmission request for the feature amount 233. The information receiving unit 111 stores the received feature amount 233 in the information storage area 130.

The coefficient calculating unit 114 respectively calculates a correlation coefficient of the feature amount 233 between respective pieces of the analysis target data 231 included in the first analysis target data 231a by using the feature amount 233 received by the information receiving unit 111.

The range specifying unit 115 respectively specifies the first range of the detection position and the second range of the detection time of the analysis target data 231 in which the correlation coefficient calculated by the coefficient calculating unit 114 satisfies a predetermined relationship among the first analysis target data 231a. For example, the range specifying unit 115 creates a cluster for each piece of analysis target data 231 in which the correlation coefficient calculated by the coefficient calculating unit 114 satisfies a predetermined relationship. For each of the created clusters, the range specifying unit 115 respectively specifies the first range of the detection position and the second range of the detection time of the analysis target data 231 included in each cluster.

Thereafter, the information receiving unit 111 receives, for example, a second condition input by the user via the operation terminal (not illustrated). The second condition is, for example, a condition including the range of the detection position and the range of the detection time, similarly to the first condition. The information specifying unit 112 refers to the meta information 232 stored in the information storage area 130 to specify the analysis target data 231 (hereinafter, also referred to as second analysis target data 231b) corresponding to the second condition received by the information receiving unit 111 and further specify the detection position and the detection time corresponding to the specified second analysis target data 231b.

The target determining unit 116 determines whether the analysis target data 231 (hereinafter, also referred to as third analysis target data 231c) which the new detection position specified by the information specifying unit 112 is included in the first range and the new detection time corresponds to the second range is included in the second analysis target data 231b.

When the target determining unit 116 determines that the third analysis target data 231c is included, the target specifying unit 117 acquires any one piece of the third analysis target data 231c from the plurality of edges 2.

Outline of First Embodiment

Figure 7:
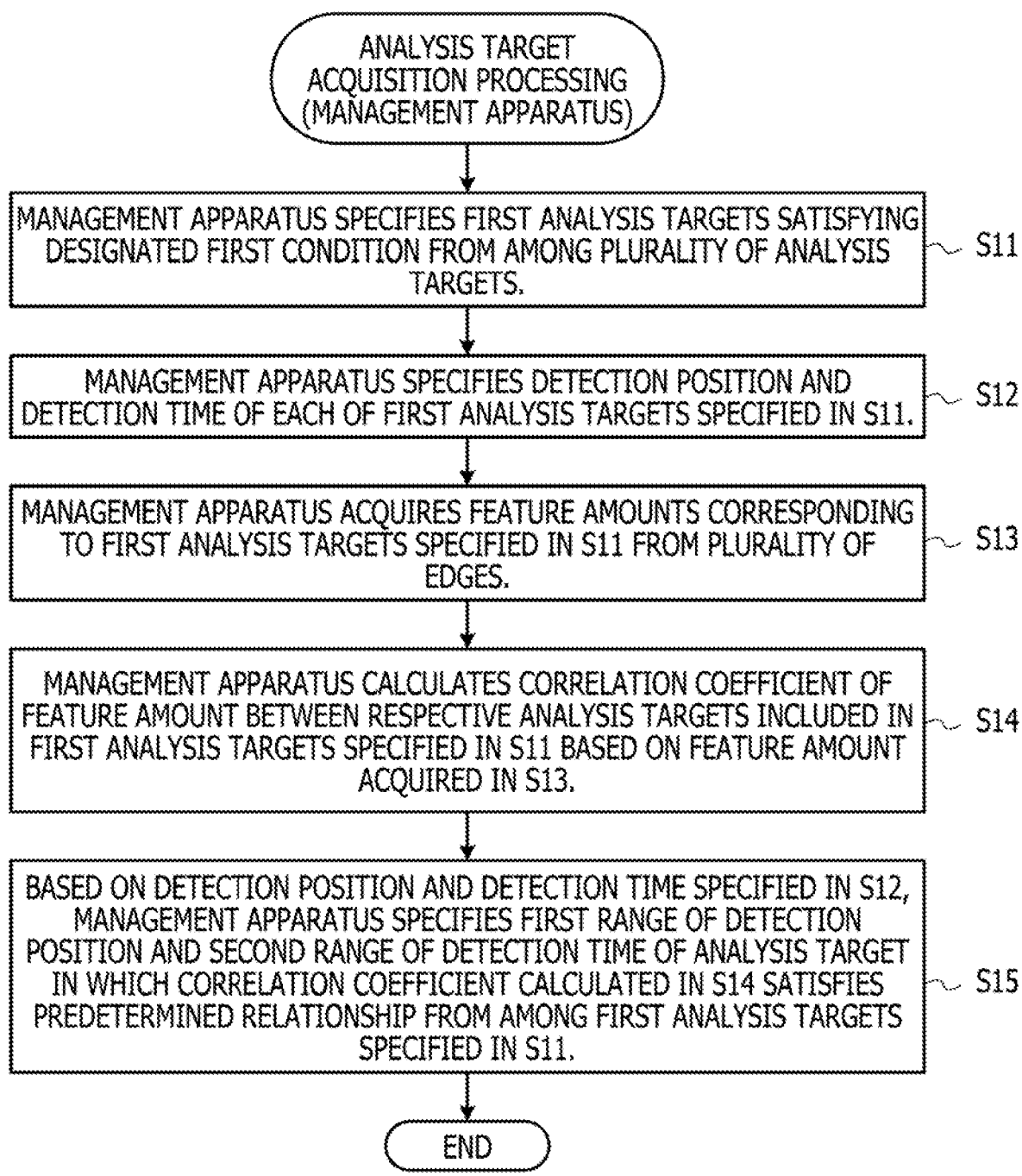
FIG. 7 is a flowchart illustrating the outline of analysis target acquisition processing in a first embodiment.
Figure 8:
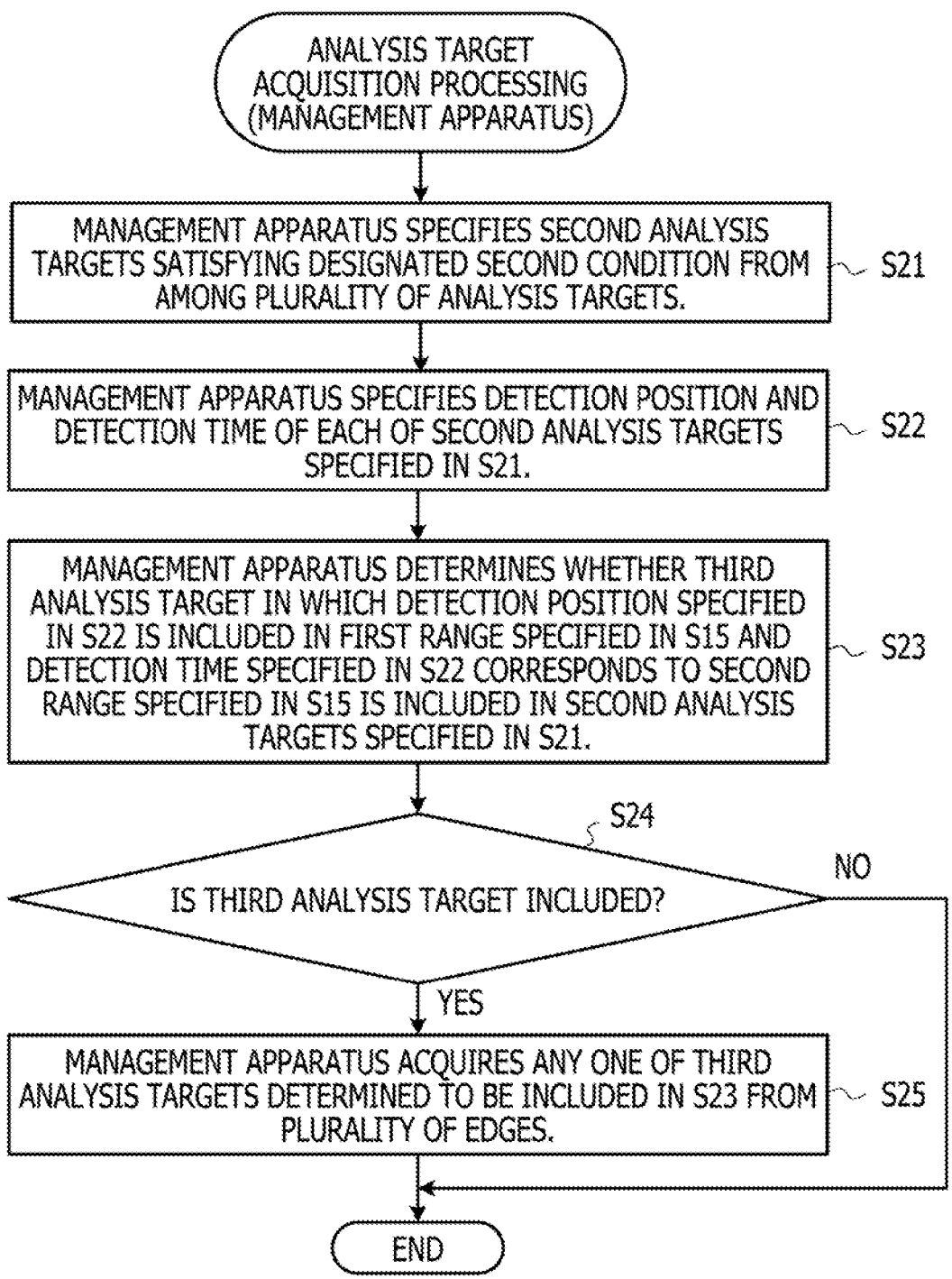
FIG. 8 is a flowchart illustrating the outline of the analysis target acquisition processing in the first embodiment.

Next, the outline of a first embodiment will be described. FIGS. 7 and 8 are flowcharts illustrating the outline of analysis target acquisition processing in the first embodiment.

As illustrated in FIG. 7, the management apparatus 1 specifies the first analysis target data 231a satisfying the first condition from among a plurality of pieces of analysis target data 231 (S11). For example, the management apparatus 1 specifies the first analysis target data 231a in response to the input of the first condition by the user via the operation terminal (not illustrated).

The management apparatus 1 specifies the detection position and the detection time of each piece of the first analysis target data 231a specified in the processing of S11 (S12).

Subsequently, the management apparatus 1 acquires, from the plurality of edges 2, the feature amounts 233 respectively corresponding to the first analysis target data 231a specified in the processing of S11 (S13).

Next, the management apparatus 1 respectively calculates a correlation coefficient of the feature amount 233 between respective pieces of analysis target data 231 included in the first analysis target data 231a specified in the processing of S11 based on the feature amount 233 acquired in the processing of S13 (S14).

The management apparatus 1 respectively specifies the first range of the detection position and the second range of the detection time of the analysis target data 231 in which the correlation coefficient calculated in the processing of S14 satisfies the predetermined relationship among the first analysis target data 231a specified in the processing of S11, based on the detection position and the detection time specified in the processing of S12 (S15). For example, the management apparatus 1 respectively specifies the first range of the detection position and the second range of the detection time of the analysis target data 231 in which the correlation coefficient calculated in the processing of S14 is equal to or greater than a predetermined threshold value among the first analysis target data 231a specified in the processing of S11.

Thereafter, as illustrated in FIG. 8, the management apparatus 1 specifies the second analysis target data 231b satisfying the second condition among the plurality of pieces of analysis target data 231 (S21). For example, the management apparatus 1 specifies the second analysis target data 231b in response to the input of the second condition by the user via the operation terminal (not illustrated).

The management apparatus 1 specifies the detection position and the detection time of each piece of the second analysis target data 231b specified in the processing of S21 (S22).

Subsequently, the management apparatus 1 determines whether the third analysis target data 231c in which the detection position specified in the processing of S22 is included in the first range specified in the processing of S15 and the detection time specified in processing of S22 corresponds to the second range specified in the processing of S15 is included in the second analysis target data 231b specified in the processing of S21 (S23).

As a result, when it is determined that the third analysis target data 231c is included in the second analysis target data 231b specified in the processing of S21 (YES in S24), the management apparatus 1 acquires any one piece of the third analysis target data 231c determined to be included in the processing of S23 from the plurality of edges 2 (S25).

Accordingly, even when each edge 2 moves over time and the configuration of the edge 2 included in each cluster is frequently updated, the management apparatus 1 may specify the analysis target data 231 to be acquired without increasing the acquisition frequency of the feature amount from each edge 2. Therefore, the management apparatus 1 may specify the analysis target data 231 to be acquired within a limited time.

Specific Example of First Embodiment

Figure 9:
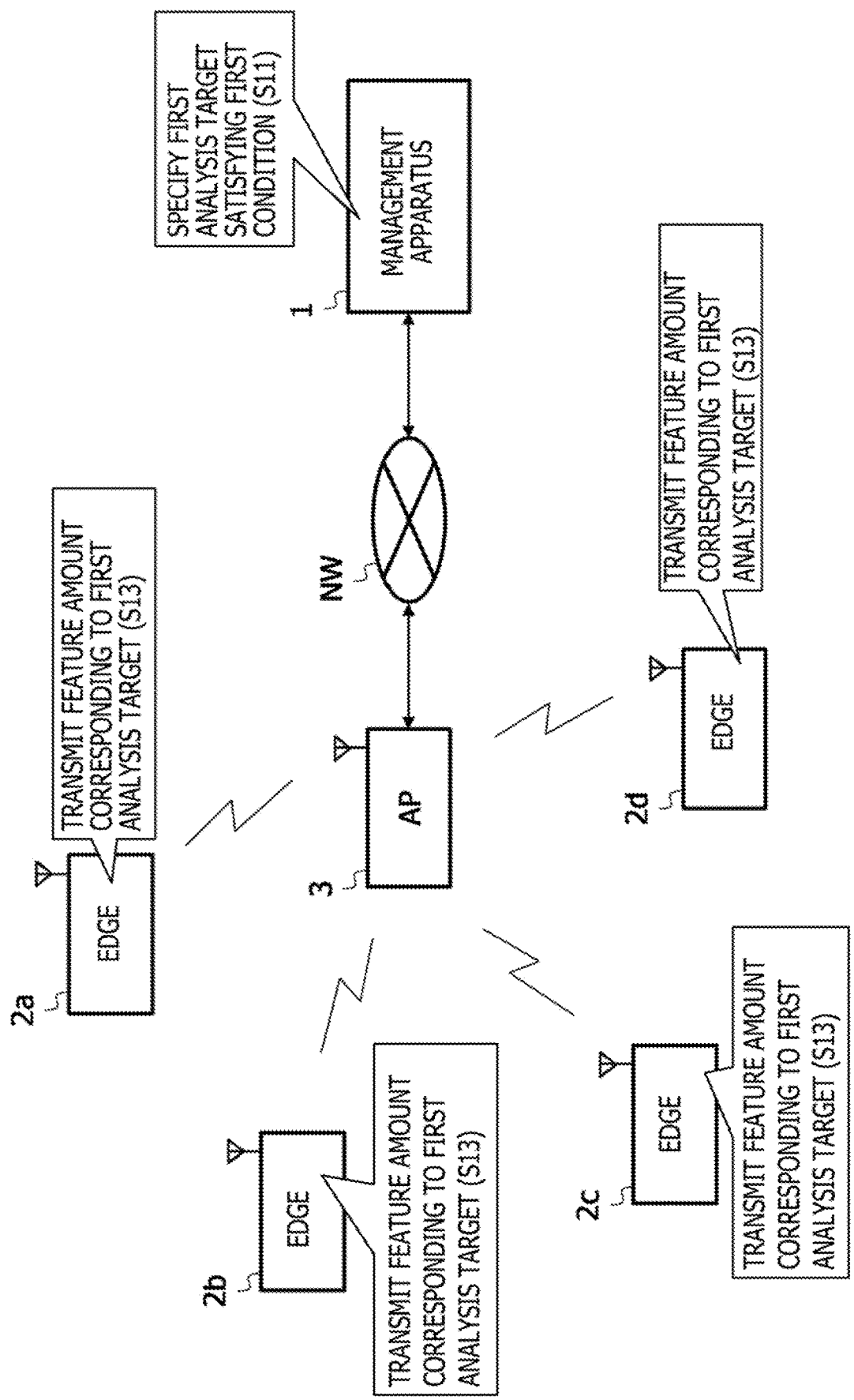
FIG. 9 is a diagram illustrating a specific example in the first embodiment.
Figure 10:
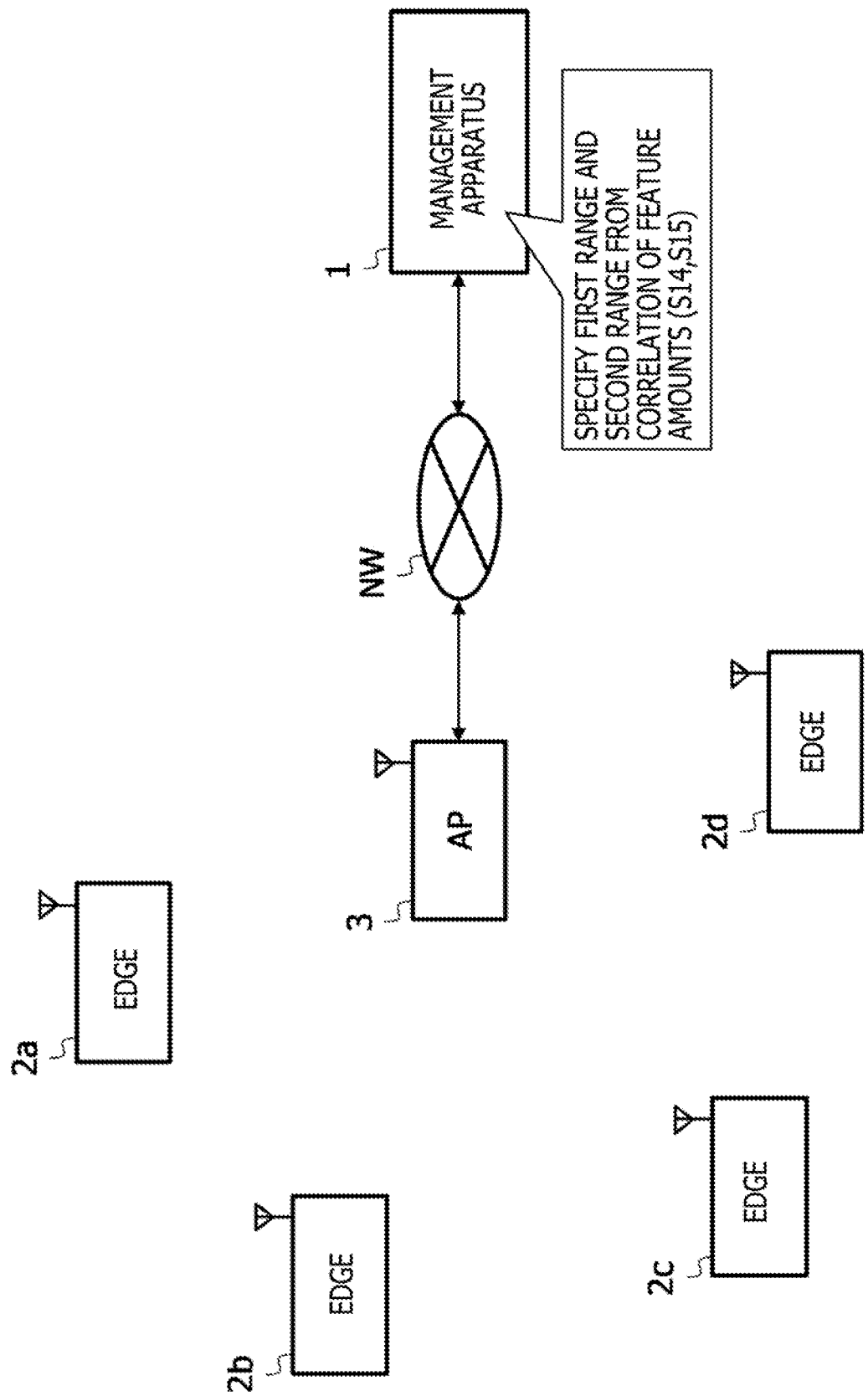
FIG. 10 is a diagram illustrating a specific example in the first embodiment.
Figure 11:
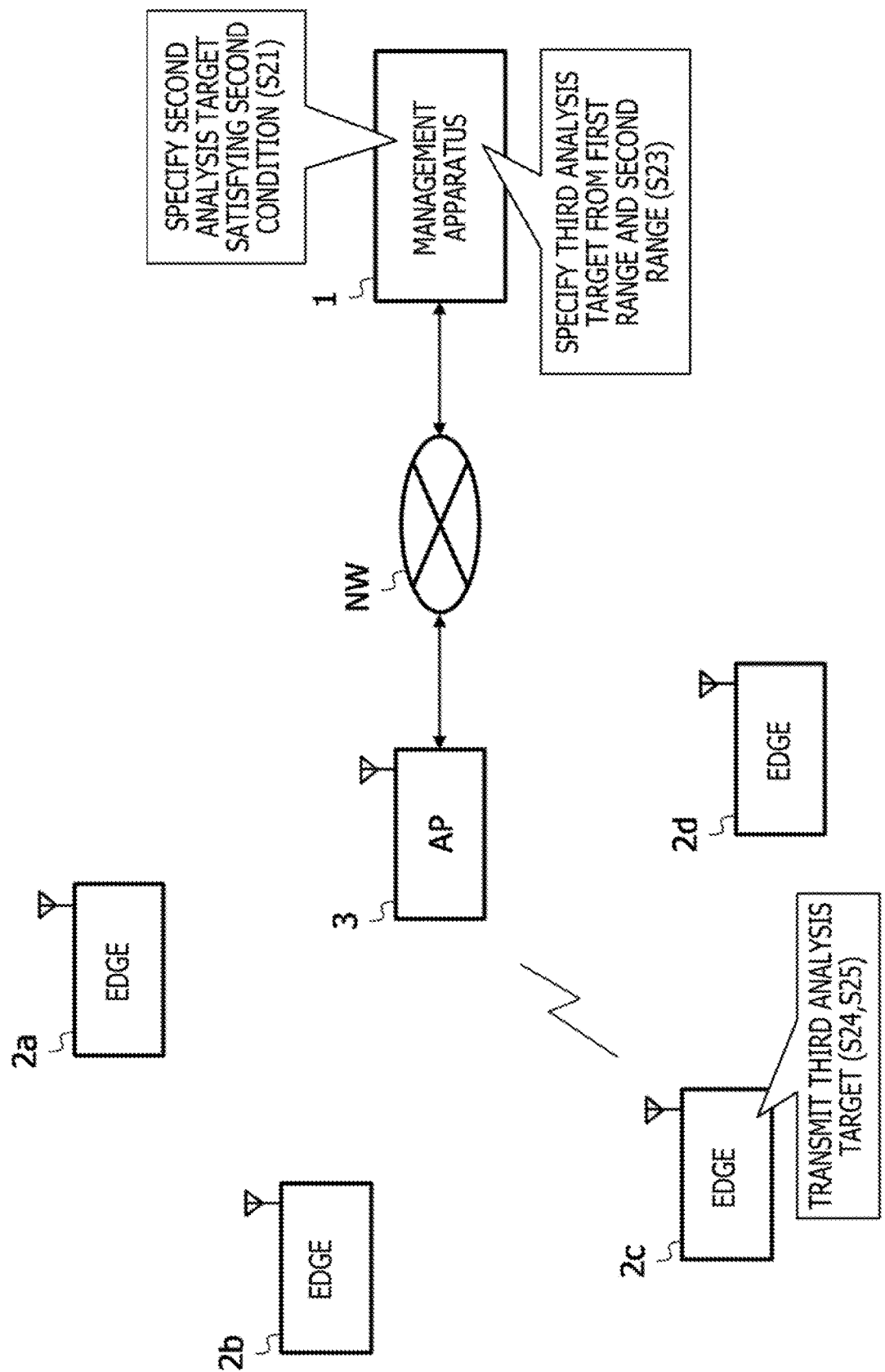
FIG. 11 is a diagram illustrating a specific example in the first embodiment.
Figure 12:
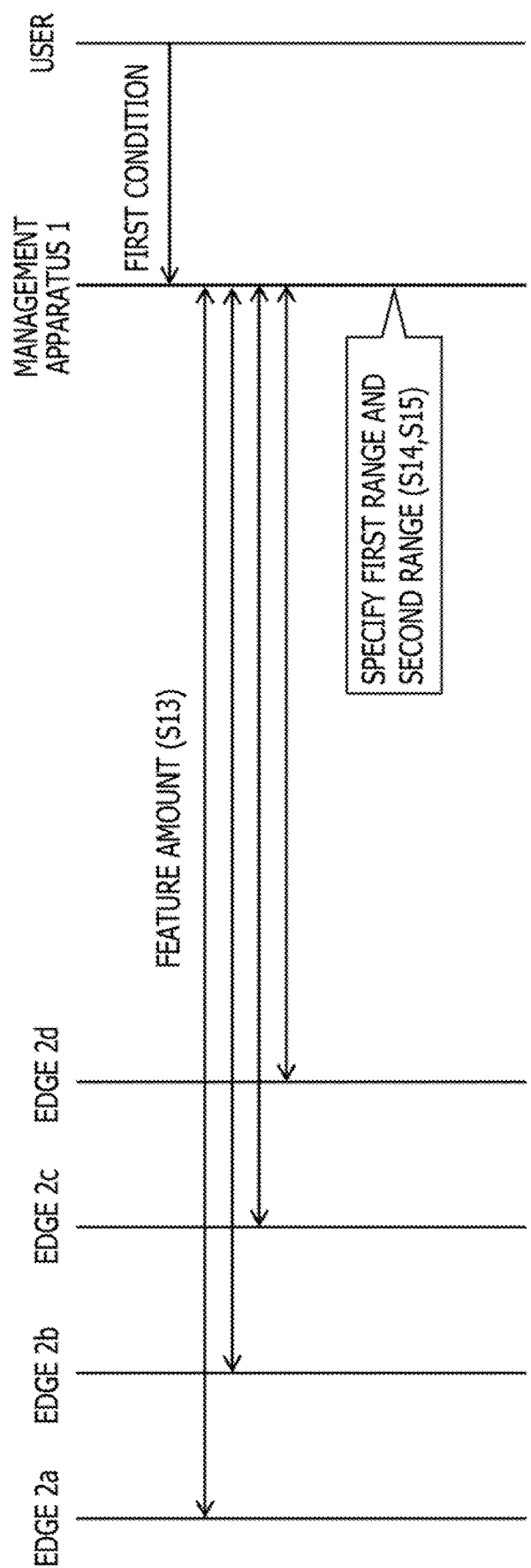
FIG. 12 is a sequence chart diagram illustrating a specific example in the first embodiment.
Figure 13:
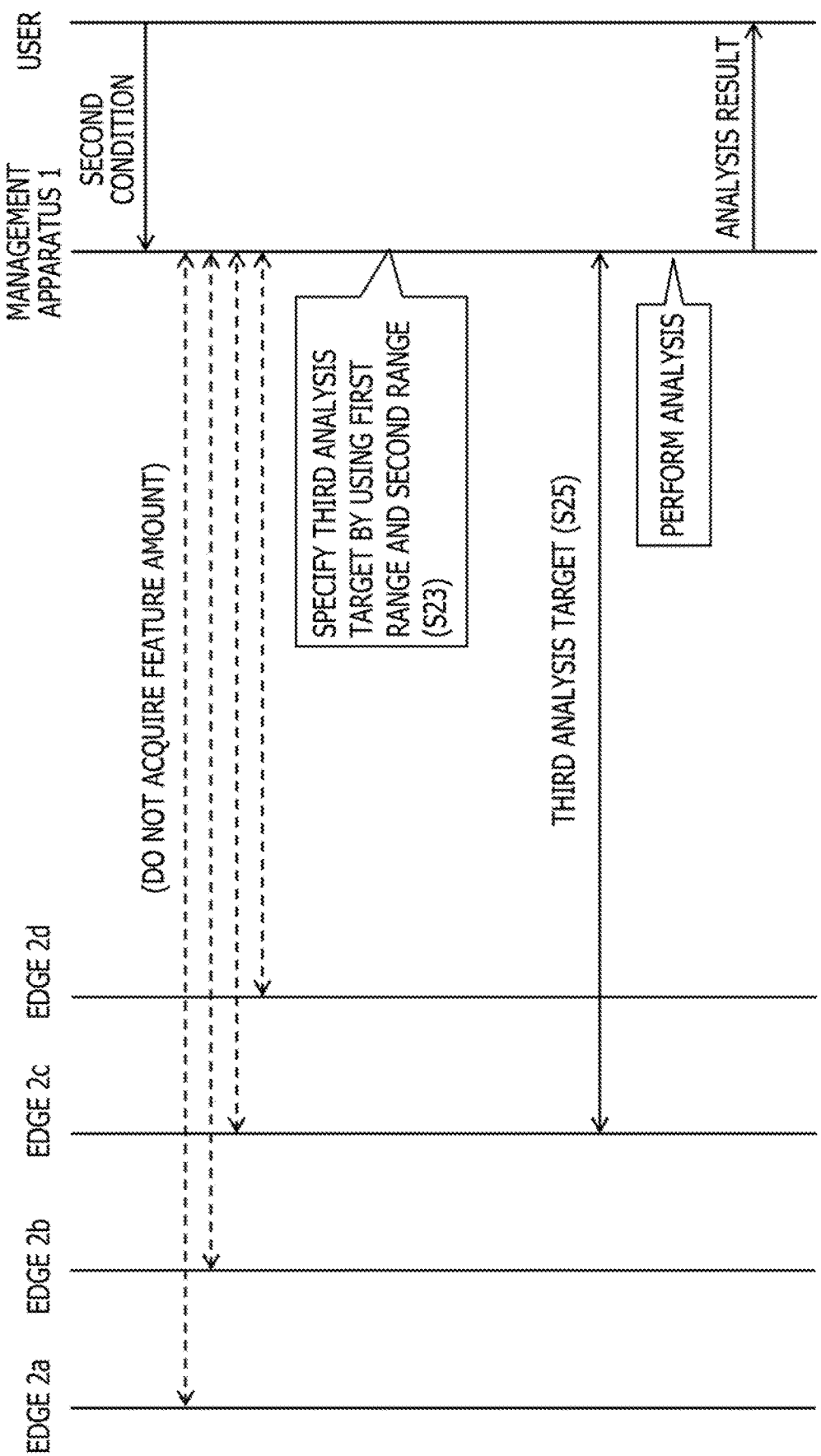
FIG. 13 is a sequence chart diagram illustrating a specific example in the first embodiment.

A specific example of storage control processing according to a first embodiment will be described. FIGS. 9 to 11 are diagrams illustrating a specific example in the first embodiment. FIGS. 12 and 13 are sequence chart diagrams illustrating a specific example in the first embodiment.

As illustrated in FIGS. 9 and 12, for example, when the first condition is input from the user, the management apparatus 1 respectively acquires the feature amounts 233 from the edges 2a, 2b, 2c, and 2d holding the first analysis target data 231a that matches the first condition (S11 to S13).

As illustrated in FIGS. 10 and 12, the management apparatus 1 specifies the first range and the second range from the feature amount 233 acquired in the processing of S13 (S14 and S15).

Thereafter, as illustrated in FIGS. 11 and 13, for example, when the second condition is input from the user, the management apparatus 1 specifies the third analysis target data 231c from the second analysis target data 231b by using the specified first range and second range (S23).

As a result, when the third analysis target data 231c exists, the management apparatus 1 specifies one piece of the existing third analysis target data 231c (the third analysis target data 231c held by the edge 2c in the example illustrated in FIG. 11). The management apparatus 1 acquires one piece of the specified third analysis target data 231c.

For example, the first range and the second range are ranges specified based on the detection position and the detection time of the analysis target data 231 in which the correlation coefficient satisfies the predetermined relationship. Therefore, when there are a plurality of pieces of analysis target data 231 whose detection time is included in the first range and whose detection position corresponds to the second range, it is possible to determine that the contents of these analysis target data 231 are similar. Therefore, in this case, the management apparatus 1 may perform control so that the analysis target data 231 having similar contents is not acquired redundantly by acquiring only one piece of the plurality of existing analysis target data 231.

For example, when the first condition (first analysis request) is input, the management apparatus 1 specifies the first range and the second range by acquiring the feature amount 233 of the first analysis target data 231a corresponding to the first condition. When the second condition (the second and subsequent analysis requests) is input, the management apparatus 1 specifies the analysis target data 231 to be acquired by using the specified first range and second range.

Accordingly, the management apparatus 1 does not have to acquire the feature amount 233 from each edge 2 at the time of inputting the second and subsequent analysis requests. Therefore, the management apparatus 1 may suppress the frequency of acquiring the feature amount 233 from each edge 2 and may shorten the time to specify the analysis target data 231 to be acquired.

Among the second analysis target data 231b, each piece of the analysis target data 231 not specified as the third analysis target data 231c is the analysis target data 231 whose content is determined not to be similar to the other analysis target data 231. Therefore, the management apparatus 1 has to acquire all of the analysis target data 231 other than the third analysis target data 231c included in the second analysis target data 231b from each edge 2.

Thereafter, as illustrated in FIG. 13, the management apparatus 1 performs analysis based on each piece of the analysis target data 231 acquired from each edge 2 and transmits the analysis result to the operation terminal (not illustrated) of the user.

Details of First Embodiment

Figure 14:
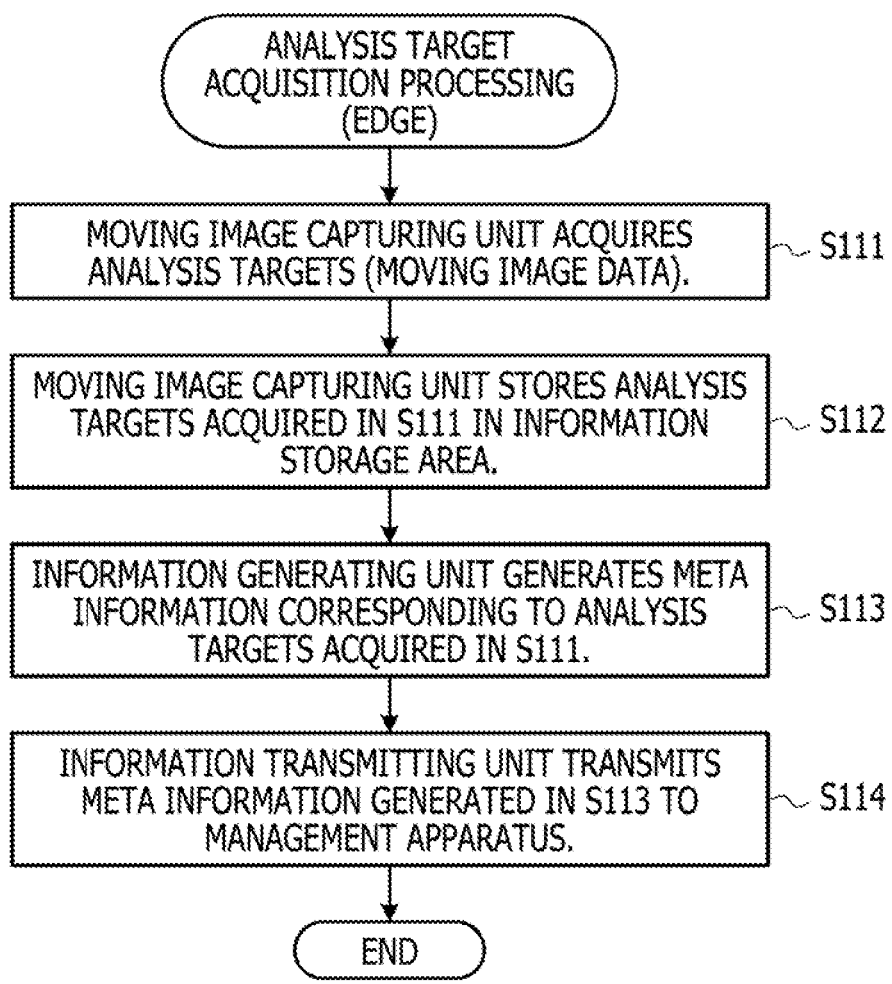
FIG. 14 is a flowchart illustrating the details of the analysis target acquisition processing in the first embodiment.
Figure 21:
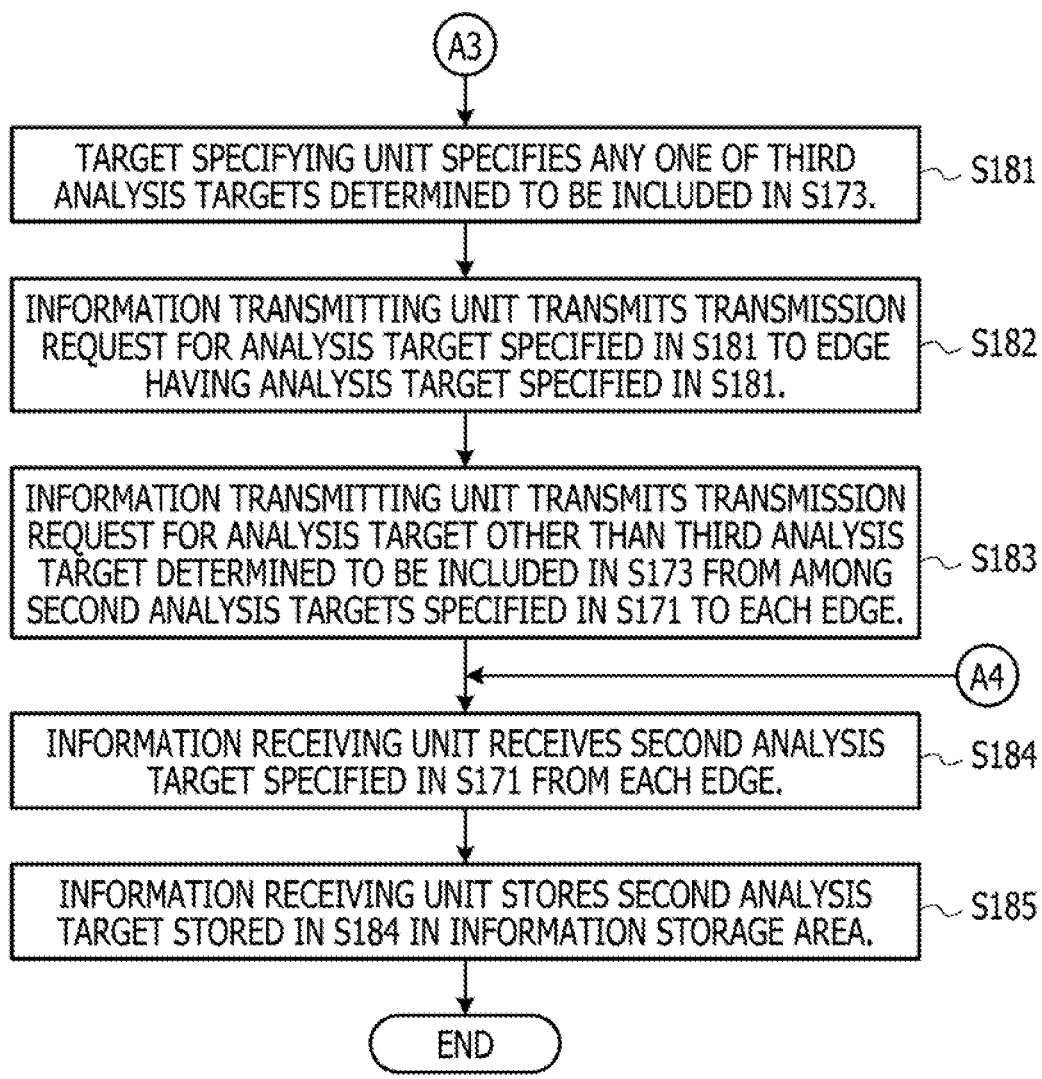
FIG. 21 is a flowchart illustrating the details of the analysis target acquisition processing in the first embodiment.

Next, the details of the first embodiment will be described. FIGS. 14 and 21 are flowcharts illustrating the details of the analysis target acquisition processing in the first embodiment. FIGS. 22 and 27 are diagrams illustrating the details of the analysis target acquisition processing in the first embodiment.

Analysis Target Acquisition Processing Performed in Each Edge

Figure 15:
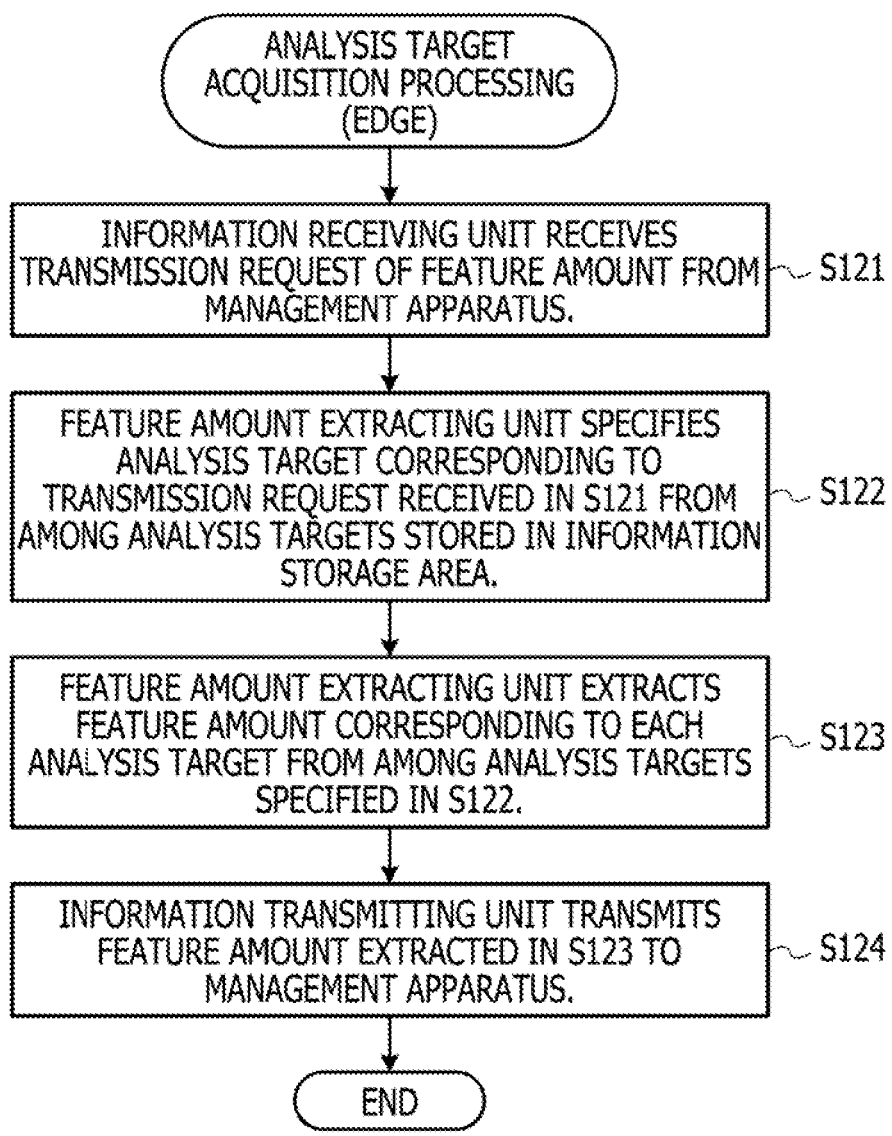
FIG. 15 is a flowchart illustrating the details of the analysis target acquisition processing in the first embodiment.
Figure 16:
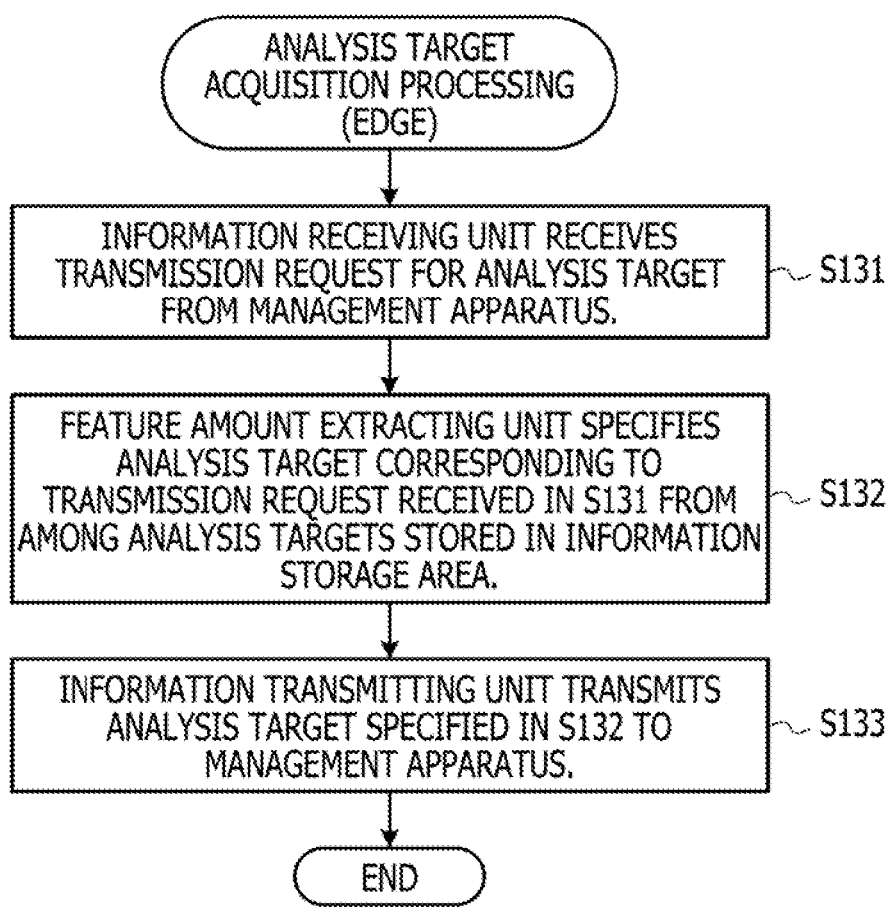
FIG. 16 is a flowchart illustrating the details of the analysis target acquisition processing in the first embodiment.

First, the analysis target acquisition processing performed in each edge 2 will be described. FIGS. 14 to 16 are flowcharts illustrating the analysis target acquisition processing performed at each edge 2. Hereinafter, the processing performed at the edge 2a will be described. The processing performed at the edges 2 other than the edge 2a is the same as the processing performed on the edge 2a, and thus the description thereof is omitted.

As illustrated in FIG. 14, the moving image capturing unit 211 of the edge 2a acquires the analysis target data 231 captured by a camera (not illustrated) (S111).

In this case, the moving image capturing unit 211 stores the analysis target data 231 acquired in the processing of S111 in the information storage area 230 (S112).

Subsequently, the information generating unit 212 of the edge 2a generates the meta information 232 corresponding to the analysis target data 231 acquired in the processing of S111 (S113). For example, every time new analysis target data 231 is captured by the camera, the information generating unit 212 generates the meta information 232 corresponding to the new analysis target data 231. A specific example of the meta information 232 will be described later.

Thereafter, the information transmitting unit 213 of the edge 2a transmits the meta information 232 generated in the processing of S113 to the management apparatus 1 (S114).

As illustrated in FIG. 15, the information receiving unit 214 of the edge 2a receives a transmission request for the feature amount 233 corresponding to each piece of analysis target data 231 from the management apparatus 1 (S121).

In this case, the feature amount extracting unit 215 of the edge 2a specifies the analysis target data 231 corresponding to the transmission request received in the processing of S121, among the analysis target data 231 stored in the information storage area 230 (S122).

Subsequently, the feature amount extracting unit 215 extracts the feature amount 233 corresponding to each piece of analysis target data 231 from the analysis target data 231 specified in the processing of S122 (S123).

Thereafter, the information transmitting unit 213 transmits the feature amount 233 extracted in the processing of S123 to the management apparatus 1 (S124).

As illustrated in FIG. 16, the information receiving unit 214 receives a transmission request for the analysis target data 231 from the management apparatus 1 (S131).

In this case, the feature amount extracting unit 215 specifies the analysis target data 231 corresponding to the transmission request received in the processing of S131, among the analysis target data 231 stored in the information storage area 230 (S132).

Thereafter, the information transmitting unit 213 transmits the analysis target data 231 specified in the processing of S132 to the management apparatus 1 (S133).

Analysis Target Acquisition Processing Performed in Management Apparatus

Next, the analysis target acquisition processing performed in the management apparatus 1 will be described. FIGS. 17 to 21 are flowcharts illustrating the analysis target acquisition processing performed by the management apparatus 1.

Figure 17:
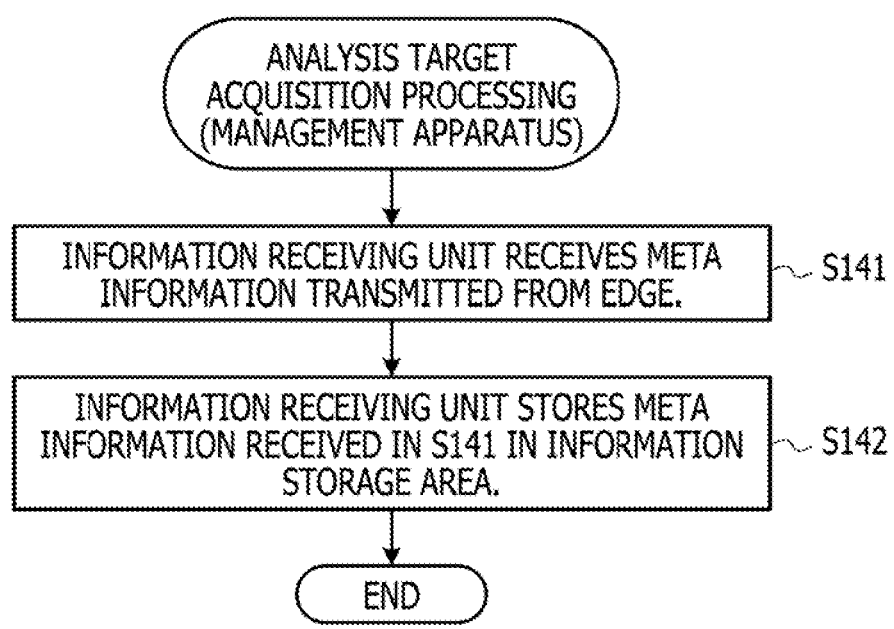
FIG. 17 is a flowchart illustrating the details of the analysis target acquisition processing in the first embodiment.
Figure 18:
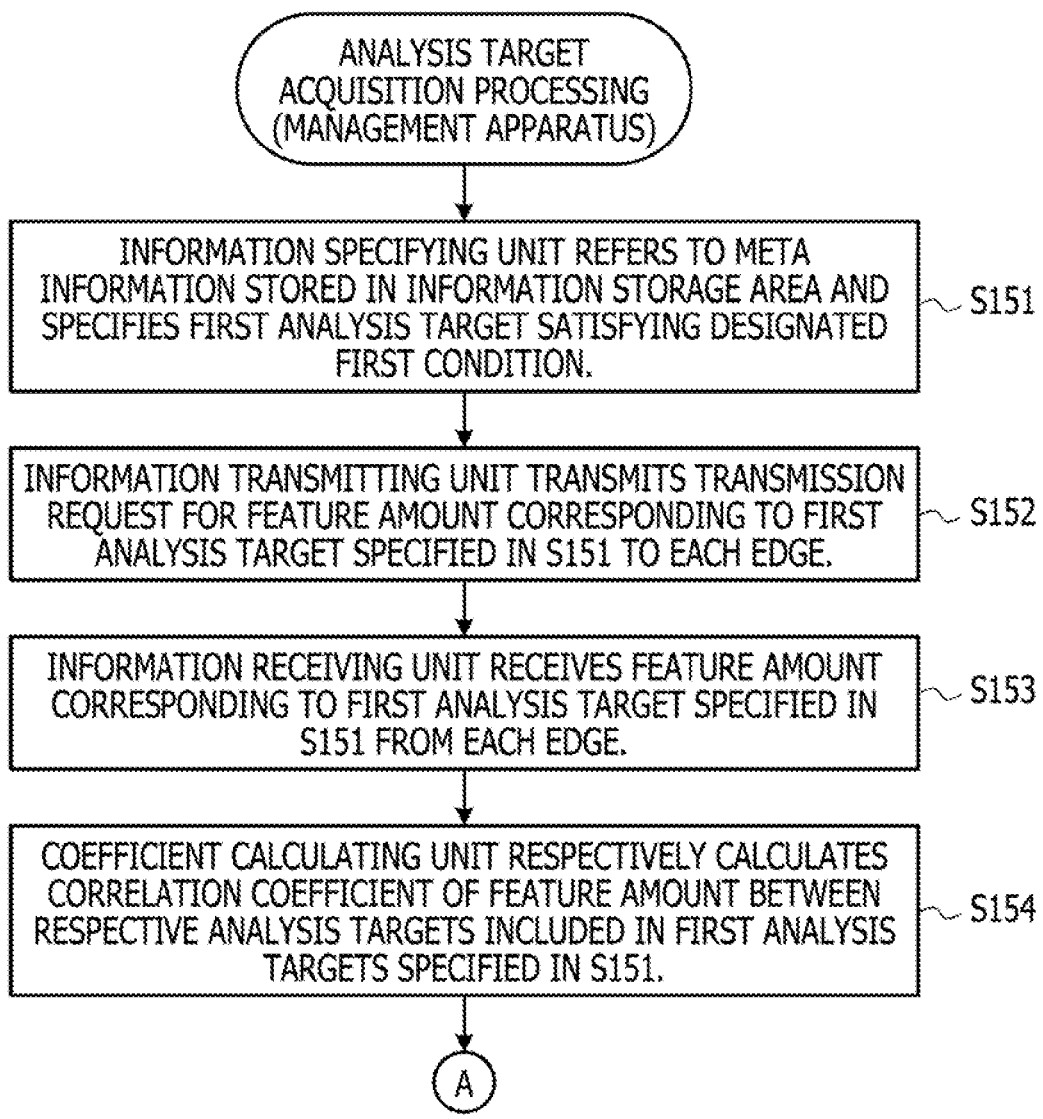
FIG. 18 is a flowchart illustrating the details of the analysis target acquisition processing in the first embodiment.

As illustrated in FIG. 17, the information receiving unit 111 of the management apparatus 1 receives the meta information 232 transmitted from each edge 2 (S141).

In this case, the information receiving unit 111 stores the meta information 232 received in the processing of S141 in the information storage area 130 (S142). Hereinafter, a specific example of the meta information 232 will be described.

Specific Example of Meta Information

FIGS. 22 and 27 are diagrams illustrating specific examples of the meta information 232. For example, FIG. 22 is a specific example of the meta information 232 corresponding to the first analysis target data 231a specified in the processing of S151 among the meta information 232 stored in the information storage area 130. Hereinafter, description will be made assuming that each piece of the analysis target data 231 captured at each edge 2 is 1-second moving image data. Hereinafter, each edge 2 will be described assuming that the meta information 232 is generated for each piece of analysis target data 231.

The meta information 232 illustrated in FIG. 22 and the like includes, as items, an "item number" for specifying each piece of information included in the meta information 232, an "edge ID" for storing identification information of the edge 2 that has detected each piece of analysis target data 231, a "detection latitude" for storing the latitude of the position where each piece of analysis target data 231 is detected, a "detection longitude" for storing the longitude of the position where each piece of analysis target data 231 is detected, and a "detection time" for storing the time when each piece of analysis target data 231 is detected.

For example, in the meta information 232 illustrated in FIG. 22, in the information in which the "item number" is "1", "E135" is stored as the "edge ID", "35.680" is stored as the "detection latitude", "139.767" is stored as the "detection longitude", and "12:02:14" is stored as the "detection time".

In the meta information 232 illustrated in FIG. 22, in the information in which the "item number" is "2", "E046" is stored as the "edge ID", "35.683" is stored as the "detection latitude", "139.765" is stored as the "detection longitude", and "12:02:29" is stored as the "detection time". Description of other information included in FIG. 22 is omitted.

Returning to FIG. 18, the information specifying unit 112 of the management apparatus 1 refers to the meta information 232 stored in the information storage area 130 to specify the first analysis target data 231a satisfying the first condition (S151). The information specifying unit 112 specifies the first analysis target data 231a in response to the input of the first condition by the user via the operation terminal (not illustrated), for example.

For example, the information specifying unit 112 refers to the meta information 232 illustrated in FIG. 22 to specify information in which the information stored in each of the "detection latitude", the "detection longitude", and the "detection time" is included in the range of the first condition. The information specifying unit 112 specifies the first analysis target data 231a by specifying the information stored in the "edge ID" of the specified information.

The information transmitting unit 113 of the management apparatus 1 transmits a transmission request for the feature amount 233 corresponding to the first analysis target data 231a specified in the processing of S151 to each edge 2

(S152). In this case, the edge 2 that has received the transmission request for the feature amount 233 performs the processing illustrated in FIG. 15.

Thereafter, the information receiving unit 111 receives the feature amount 233 corresponding to the first analysis target data 231a specified in the processing of S151 from each edge 2 (S153).

The coefficient calculating unit 114 respectively calculates a correlation coefficient of the feature amount 233 between respective pieces of analysis target data 231 included in the first analysis target data 231a specified in the processing of S151 (S154).

For example, the coefficient calculating unit 114 converts the detection latitude and the detection longitude corresponding to each piece of analysis target data 231 into the values of 1 (hereinafter, also referred to as specific values) by using, for example, Geohash, which is a function for converting the latitude and the longitude into the values of 1. For example, the coefficient calculating unit 114 plots points corresponding to a specific value, the detection time, and the feature amount (for example, the number of persons captured in the analysis target data 231) of each piece of analysis target data 231 in a 3D space with respect to the 3D space with an X-axis, a Y-axis, and a Z-axis as a specific value, a detection time, and a feature amount, respectively. Thereafter, the coefficient calculating unit 114 calculates, for example, a distance between points corresponding to the respective pieces of analysis target data 231 as a correlation coefficient between the respective pieces of analysis target data 231.

Figure 19:
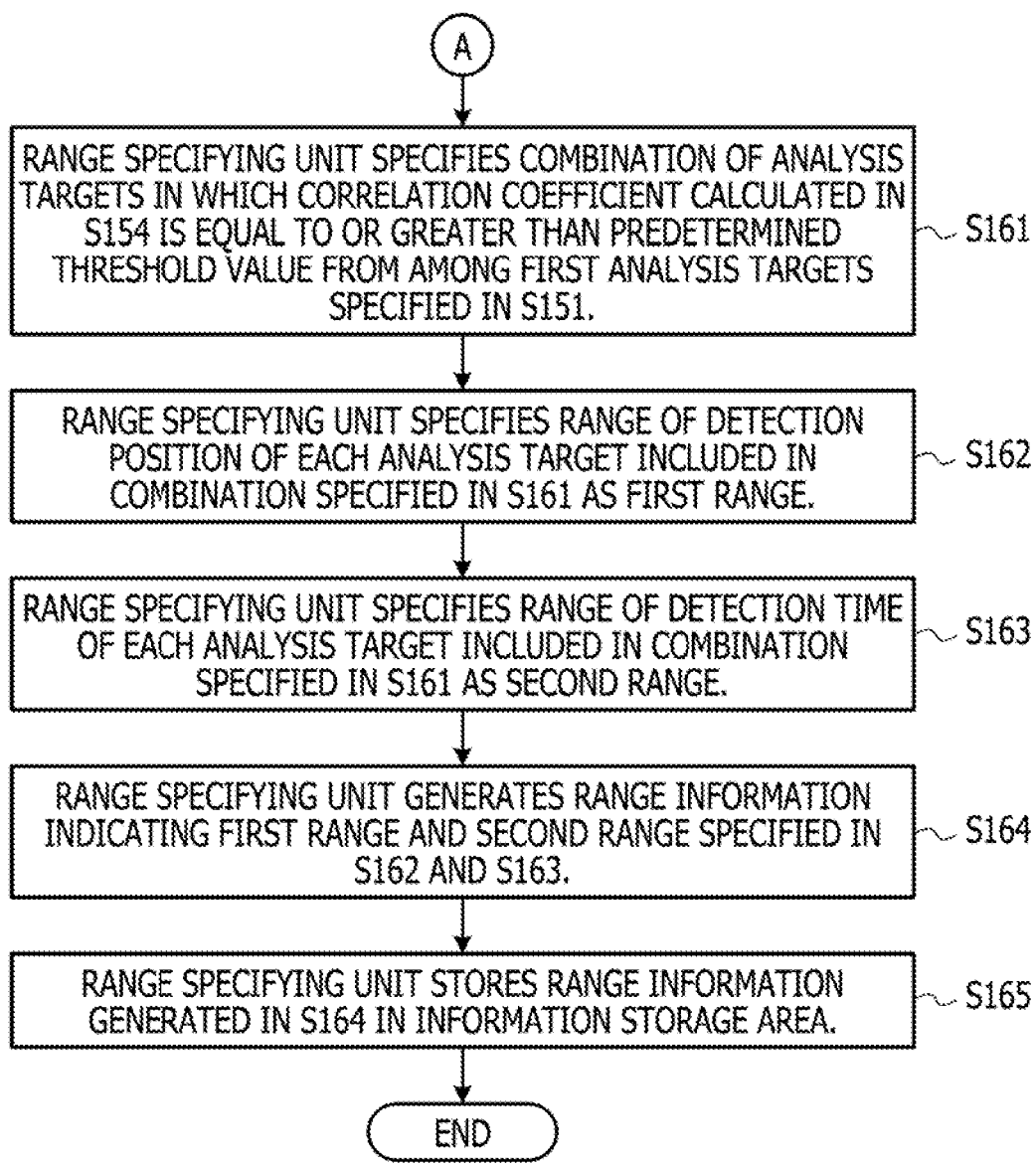
FIG. 19 is a flowchart illustrating the details of the analysis target acquisition processing in the first embodiment.
Figure 20:
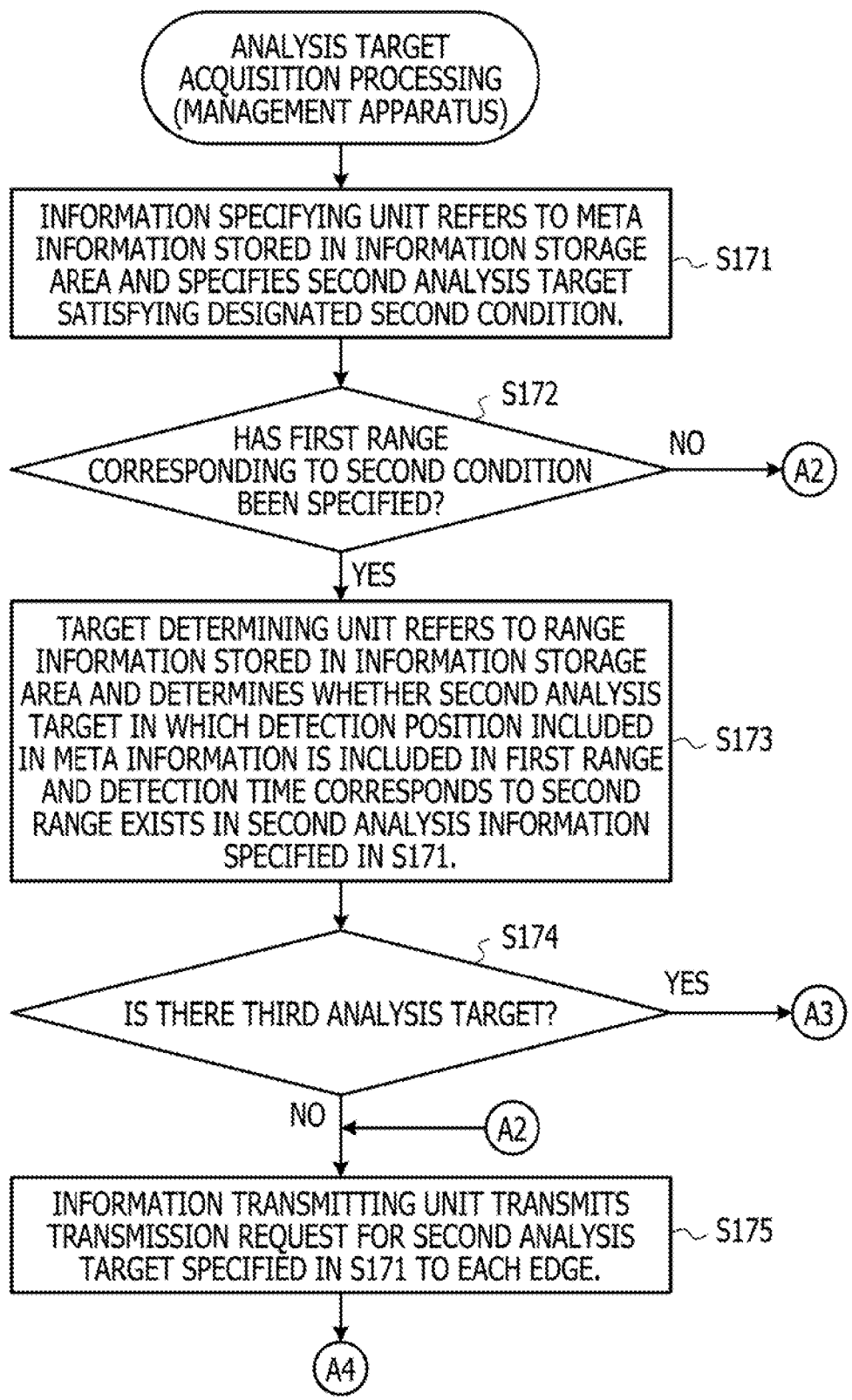
FIG. 20 is a flowchart illustrating the details of the analysis target acquisition processing in the first embodiment.

Subsequently, as illustrated in FIG. 19, the range specifying unit 115 of the management apparatus 1 specifies a combination of two or more pieces of analysis target data 231 in which the correlation coefficient calculated in the processing of S154 is equal to or greater than the predetermined threshold value, from among the first analysis target data 231a specified in the processing of S151 (S161).

The range specifying unit 115 specifies the range of the detection position of each piece of analysis target data 231 included in the combination specified in the processing of S161 as the first range (S162). The range specifying unit 115 specifies a predetermined range as the second range with respect to the range of the detection time of each piece of analysis target data 231 included in the combination specified in the processing of S161 (S163).

The range specifying unit 115 generates range information 131 indicating the first range and the second range specified in the processing of S162 and S163 (S154).

Thereafter, the range specifying unit 115 stores the range information 131 generated in the processing of S164 in the information storage area 130 (S165).

When a plurality of combinations are specified in the processing of S161, the range specifying unit 115 performs the processing of S162 to S165 for each specified combination. Hereinafter, a specific example of the range information 131 will be described.

Specific Example of Range Information

Figure 25:
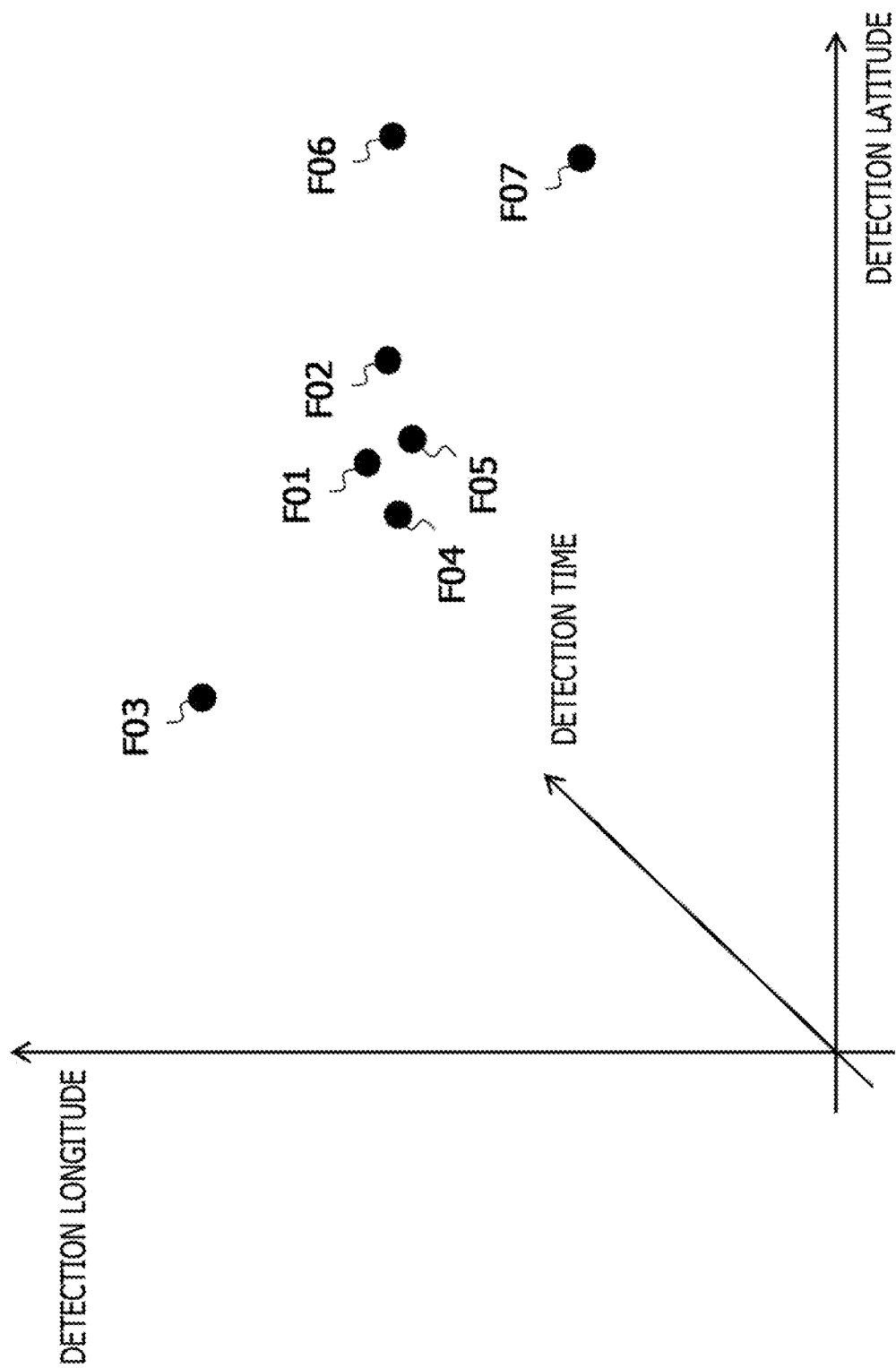
FIG. 25 is a diagram illustrating the concept of the range indicated by the range information.
Figure 26:
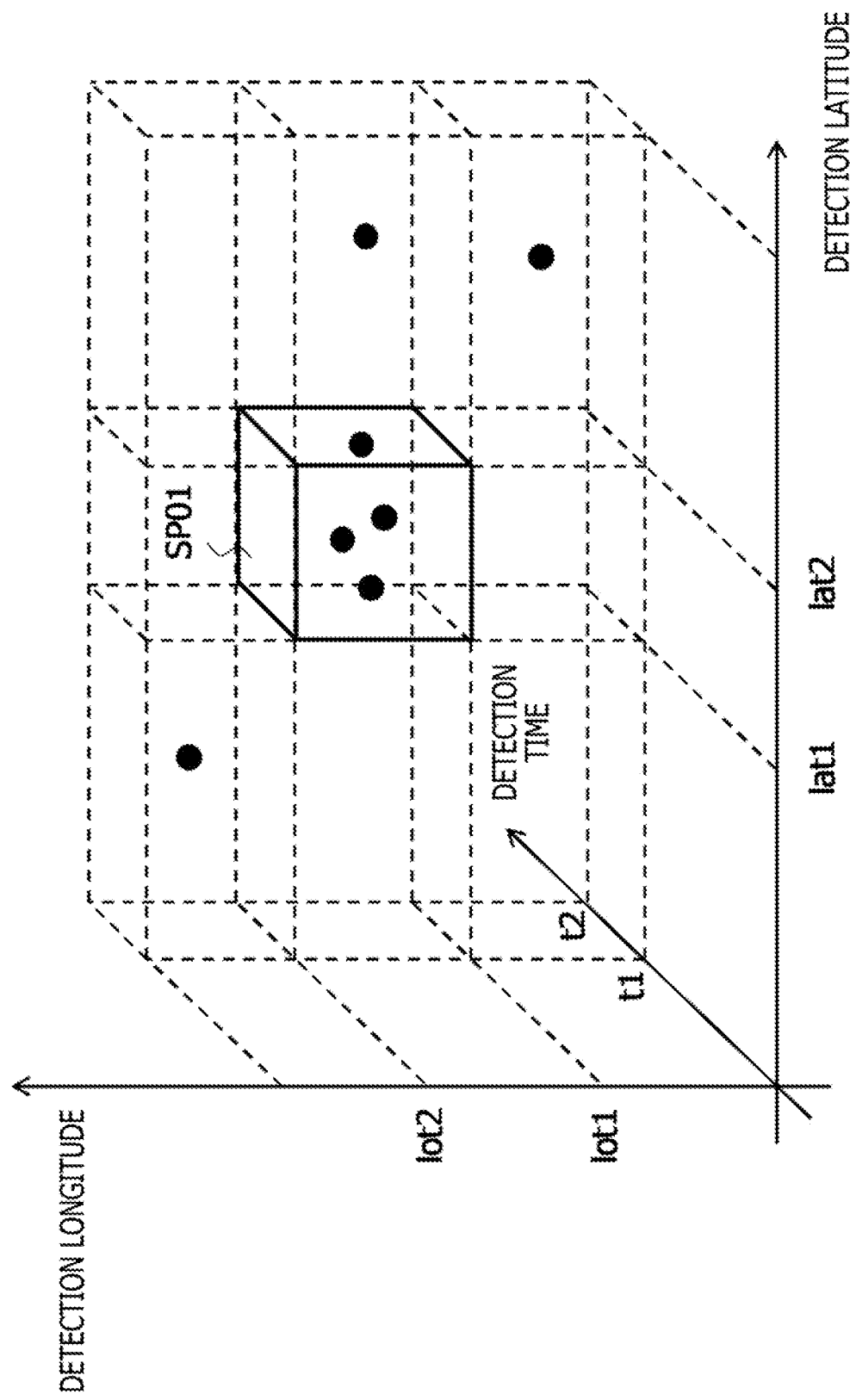
FIG. 26 is a diagram illustrating the concept of the range indicated by the range information.

FIGS. 23 and 24 are diagrams illustrating specific examples of the range information 131. FIGS. 25 and 26 are diagrams illustrating the concept of the range indicated by the range information 131. Hereinafter, description will be made assuming that the information having the "item number" of "1", "2", "4", and "5" included in the meta information 232 illustrated in FIG. 22 is the information corresponding to the combination of the analysis target data 231 in which the correlation in the processing of S161 is equal to or greater than a predetermined threshold value.

The range information 131 illustrated in FIG. 23 includes, as items, "detection latitude" in which a range of detection latitude included in the first range is stored, "detection longitude" in which a range of detection longitude included in the first range is stored, and "detection time" in which a time corresponding to the second range is stored.

For example, in the meta information 232 illustrated in FIG. 22, "35.680", "35.683", "35.679", and "35.681" are stored in the "detection latitudes" of the pieces of information having the "item number" of "1", "2", "4", and "5", respectively. Therefore, as illustrated in FIG. 23, the range specifying unit 115 sets a range from the minimum value "35.679" to the maximum value "35.683" among these pieces of information, as the "detection latitude" in the range information 131.

In the meta information 232 illustrated in FIG. 22, "139.767", "139.765", "139.766", and "139.765" are respectively stored in the "detection longitude" of the information having the "item number" of "1", "2", "4", and "5", Therefore, as illustrated in FIG. 23, the range specifying unit 115 sets a range from the minimum value "139.765" to the maximum value "139.767" among these pieces of information, as the "detection longitude" in the range information 131.

In the meta information 232 illustrated in FIG. 22, "12:02:12", "12:02:14", "12:02:29", and "12:02:45" are stored in the "detection time" of the information having the "item number" of "1", "2", "4", and "5", respectively. Therefore, for example, as illustrated in FIG. 23, the range specifying unit 115 sets "33 (seconds)", which is the elapsed time from the minimum value "12:02:12" to the maximum value "12:02:45" among these pieces of information, as the "detection time" in the range information 131.

In the processing of S162, the range specifying unit 115 may specify a range obtained by adding a predetermined range to the range of the detection position of the analysis target data 231 specified in the processing of S161 as the first range. In the processing of S163, the range specifying unit 115 may specify a range obtained by adding the predetermined range to the range of the detection time of the analysis target data 231 specified in the processing of S161 as the second range.

For example, as illustrated in FIG. 24, the range specifying unit 115 may set a range from "35.677" smaller than "35.679" to "35.685" larger than "35.683" as the "detection latitude" in the range information 131.

The range specifying unit 115 may set a range from "139.763" smaller than "139.765" to "139.769" larger than "139.767" as the "detection longitude" in the range information 131.

The range specifying unit 115 may set "37 (seconds)", which is an elapsed time from "12:02:12" smaller than "12:02:10" to "12:02:45" larger than "12:02:47", as the "detection time" in the range information 131.

Next, the concept of the range indicated by the range information 131 will be described, FIG. 25 is a graph in which points of information (information corresponding to each piece of analysis target data 231) included in the meta information 232 illustrated in FIG. 22 are plotted in the 3D space with the X-axis, the Y-axis, and the Z-axis as a detection latitude, a detection longitude, and a detection time, respectively. FIG. 26 is a graph in which a range (hereinafter, also referred to as a space SP01) corresponding to the range information 131 described in FIG. 24 is superimposed on the graph illustrated in FIG. 25.

For example, in FIG. 25, points F01, F02, F03, F04, F05, F06, and F07 correspond to pieces of information having the "item number" of "1" to "7" the meta information 232 illustrated in FIG. 22, respectively.

In FIG. 26, "lat1" and "lat2" correspond to, for example, "35.677" and "35.685" stored in the "detection latitude" of the range information 131 illustrated in FIG. 24, respectively. Similarly, in FIG. 26, "lot1" and "lot2" correspond to, for example, "139.763" and "139.769" stored in the "detection longitude" of the range information 131 illustrated in FIG. 24, respectively. In FIG. 26, "t1" and "t2" correspond to, for example, "12:02:47" and "12:02:10" used for calculating "37 (seconds)" stored in the "detection time" of the range information 131 illustrated in FIG. 24, respectively.

For example, when a plurality of pieces of analysis target data 231 corresponding to a new condition (second condition) designated by the user for the second time or later are included in the space SP01, the management apparatus 1 acquires only one of the plurality of pieces of analysis target data 231 included in the space SP01 from the edge 2.

In the "detection time" of the range information 131 illustrated in FIG. 24 and the like, the elapsed time from the minimum value to the maximum value is stored, instead of the range (for example, the range from t1 to t2 illustrated in FIG. 26) from the minimum time to the maximum time of the information stored in the "detection time" of the meta information 232 illustrated in FIG. 22.

Accordingly, as will be described later, even when the second condition having a detection time different from that of the first condition is input, the management apparatus 1 may use the specified first range and second range when acquiring the analysis target data 231 corresponding to the second condition. Therefore, the management apparatus 1 may increase the probability of using the specified first range and second range, and may more efficiently acquire the analysis target data 231 corresponding to the second condition.

Returning to FIG. 20, the information specifying unit 112 refers to the meta information 232 stored in the information storage area 130 and specifies the second analysis target data 231b satisfying the second condition (S171). The information specifying unit 112 specifies the second analysis target data 231b, for example, in response to the input of the second condition by the user via the operation terminal (not illustrated).

The target determining unit 116 of the management apparatus 1 determines, for example, whether the detection position included in the second condition is included in the first range specified in the processing of S162 (S172). For example, before acquiring the analysis target data 231 corresponding to the second condition, the target determining unit 116 determines whether the usable first range and the second range have been specified.

For example, even when the detection position (range of detection positions) included in the second condition does not completely include the first range specified in the processing of S162, when the matching rate of the detection position included in the second condition and the first range specified in the processing of S162 are equal to or greater than a predetermined threshold value, the target determining unit 116 may determine that the detection position included in the second condition is included in the first range specified in the processing of S162.

As a result, when it is determined that the detection position included in the second condition is included in the first range specified in the processing of S162 (YES in S172), the target determining unit 116 refers to the range information 131 stored in the information storage area 130 and determines whether the third analysis target data 231c in which the detection position included in the meta information 232 in the first range and the detection time corresponds to the second range exists in the second analysis target data 231b specified in the processing of S171 (S173). Hereinafter, a specific example of the processing of S173 will be described.

Specific Example of Processing of S173

FIG. 27 is a specific example of the meta information 232 corresponding to the second analysis target data 231b specified in the processing of S171 among the meta information 232 stored in the information storage area 130.

For example, in the meta information 232 illustrated in FIG. 27, in the information having the "item number" of "1", "E321" is stored as the "edge ID", "35.682" is stored as the "detection latitude", "139.766" is stored as the "detection longitude", and "15:33:03" is stored as the "detection time".

In the meta information 232 illustrated in FIG. 27, in the information having the "item number" of "2", "E023" is stored as the "edge ID", "35.679" is stored as the "detection latitude", "139.767" is stored as the "detection longitude", and "15:33:51" is stored as the "detection time".

In the meta information 232 illustrated in FIG. 27, in the information having the "item number" of "3", "E321" is stored as the "edge ID", "35.666" is stored as the "detection latitude", "139.780" is stored as the "detection longitude", and "15:33:28" is stored as the "detection time".

In the meta information 232 illustrated in FIG. 27, in the information having the "item number" of "4", "E146" is stored as the "edge ID", "35.681" is stored as the "detection latitude", "139.765" is stored as the "detection longitude", and "15:33:11" is stored as the "detection time".

Therefore, in the meta information 232 illustrated in FIG. 27, each of the values set as the "detection latitude" of the information having the "item number" of "1", "2", and "4" is included in the range stored in the "detection latitude" of the range information 131 illustrated in FIG. 24. Each of the values set as the "detection longitude" of the information having the "item number" of "1", "2", and "4" is included in the range stored in the "detection longitude" of the range information 131 illustrated in FIG. 24.

The time difference (8 seconds) between the time stored in the "detection time" of the information having the "item number" of "1" and the time stored in the "detection time" of the information having the "item number" of "4" is smaller than the time stored in the "detection time" of the range information 131 illustrated in FIG. 24. On the other hand, the time difference (48 seconds) between the time stored in the "detection time" of the information having the "item number" of "1" and the time stored in the "detection time" of the information having the "item number" of "2" and the time difference (40 seconds) between the time stored in the "detection time" of the information having the "item number" of "2" and the time stored in the "detection time" of the information having the "item number" of "4" are larger than the time stored in the "detection time" of the range information 131 illustrated in FIG. 24.

Therefore, in this case, the target determining unit 116 specifies, as the third analysis target data 231c, the analysis target data 231 corresponding to the information having the "item number" of "1" and the information having the "item number" of "4", from among the information included in the meta information 232 illustrated in FIG. 27.

For example, by referring to the range information 131 illustrated in FIG. 24, the management apparatus 1 may use the specified first range and second range when acquiring the analysis target data 231 corresponding to the second condition even when the second condition having a detection time different from that of the first condition is input.

Accordingly, the management apparatus 1 may increase the probability of using the specified first range and second range, and may more efficiently acquire the analysis target data 231 corresponding to the second condition.

Returning to FIG. 20, when it is determined that the third analysis target data 231c does not exist (NO in S174), the information transmitting unit 113 transmits a transmission request for the second analysis target data 231b specified in the processing of S171 to each edge 2 (S175).

The information transmitting unit 113 also performs the processing from S174 onward when it is determined that the detection position included in the second condition is not included in the first range specified in the processing in S162 (NO in S172).

For example, in this case, the management apparatus 1 determines that the number of pieces of analysis target data 231 acquired from each edge 2 may not be suppressed even by using the first range and the second range specified in advance. Therefore, the management apparatus 1 transmits a transmission request to all the edges 2 holding the second analysis target data 231b specified in the processing of S171.

On the other hand, when it is determined that the third analysis target data 231c exists (YES in S174), as illustrated in FIG. 21, the target specifying unit 117 of the management apparatus 1 specifies any one piece of the third analysis target data 231c determined to be included in the processing of S173 (S181).

The information transmitting unit 113 transmits a transmission request for the analysis target data 231 specified in the processing of S181 to the edge 2 having the analysis target data 231 specified in the processing of S181 (S182).

For example, in this case, the management apparatus 1 determines that the number of pieces of analysis target data 231 acquired from each edge 2 may be suppressed by using the first range and the second range specified in advance. Therefore, the management apparatus 1 transmits a transmission request to only the edge 2 holding one piece of the third analysis target data 231c determined to be included in the processing of S172.

The information transmitting unit 113 transmits a transmission request for the analysis target data 231 other than the third analysis target data 231c determined to be included in the processing of S173 to each edge 2 (S183) from among the second analysis target data 231b specified in the processing of S171.

Subsequently, after the processing of S175 or S183, the information receiving unit 111 receives the second analysis target data 231b specified in the processing of S171 from each edge 2 (S184).

Thereafter, the information receiving unit 111 stores the second analysis target data 231b stored in the processing of S184 in the information storage area 130 (S185).

As described above, the management apparatus 1 according to the present embodiment specifies the detection position and the detection time of each piece of the first analysis target data 231a satisfying the first condition from among the plurality of pieces of analysis target data 231 detected at each edge 2. The management apparatus 1 acquires the feature amount 233 corresponding to each piece of the first analysis target data 231a from the plurality of edges 2.

Subsequently, the management apparatus 1 respectively calculates a correlation coefficient of the feature amount 233 between respective pieces of analysis target data 231 included in the first analysis target data 231a. The management apparatus 1 respectively specifies the first range of the detection position and the second range of the detection time of the analysis target data 231 in which the calculated correlation coefficient satisfies the predetermined relationship among the first analysis target data 231a.

Thereafter, the management apparatus 1 specifies a new detection position and a new detection time of the second analysis target data 231b satisfying the second condition from among the plurality of pieces of analysis target data 231 detected at each edge 2. The management apparatus 1 determines whether the third analysis target data 231c in which the specified new detection position is included in the first range and the specified new detection time corresponds to the second range is included in the second analysis target data 231b. As a result, when it is determined that the third analysis target data 231c is included, the management apparatus 1 acquires any one piece of the third analysis target data 231c from the plurality of edges 2.

For example, the management apparatus 1 specifies the edge 2 from which analysis target data 231 is acquired based on the relationship between the detection position and the detection time of each piece of analysis target data 231, instead of the relationship with other edges 2 included in the same cluster.

Accordingly, even when each edge 2 moves over time and the configuration of the edge 2 included in each cluster is frequently updated, the management apparatus 1 may specify the edge 2 from which the analysis target data 231 is acquired without increasing the frequency of acquiring the feature amount 233 from each edge 2. Therefore, the management apparatus 1 may specify the edge 2 from which the analysis target data 231 is acquired within an allowed time.

The information specifying unit 112 may allocate the first analysis target data 231a satisfying the first condition to a plurality of groups in the processing of S151. For example, the information specifying unit 112 may allocate respective pieces of the analysis target data 231 into the plurality of groups so that a plurality of analysis target data 231 (a plurality of pieces of analysis target data 231 that are close to each other in the space illustrated in FIG. 26) whose values (at least one value of detection latitude, detection longitude, and detection time) included in the meta information 232 stored in the information storage area 130 are close to each other belong to the same group. The management apparatus 1 may perform the processing from S152 onward for each divided group.

Accordingly, the management apparatus 1 may reduce the processing load associated with the calculation of the correlation coefficient between respective pieces of the analysis target data 231. Therefore, the management apparatus 1 may reduce the processing load for executing the analysis target acquisition processing.

The management apparatus 1 may recreate the first range and the second range at predetermined time intervals. Accordingly, the management apparatus 1 may maintain the accuracy of the first range and the second range.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An analysis apparatus, comprising:
a memory; and
a processor coupled to the memory and the processor configured to:
acquire a plurality of pieces of analysis target data collected at a plurality of edges;
determine first analysis target data satisfying a first condition from among the plurality of pieces of analysis target data;
specify a first detection position indicating a position at which each piece of the determined first analysis target data is detected at the plurality of edges and a first detection time indicating a time when each piece of the determined first analysis target data is detected at the plurality of edges by referring to the memory that stores meta information corresponding to the plurality of pieces of analysis target data;
acquire a feature amount corresponding to each piece of the first analysis target data from the plurality of edges;
calculate a correlation coefficient of the feature amount between respective pieces of analysis target data included in the first analysis target data;
specify a first range of the first detection position and a second range of the first detection time of the first analysis target data for which the calculated correlation coefficient satisfies a predetermined relationship, from among the first analysis target data;
determine second analysis target data which satisfies a second condition from among the plurality of pieces of analysis target data;
specify a second detection position and a second detection time corresponding to the determined second analysis target data by referring to the memory;
determine whether specific analysis target data in which the specified second detection position is included in the first range and the specified second detection time corresponds to the second range is included in the second analysis target data; and
acquire any one piece of the specific analysis target data from the plurality of edges when it is determined that the specific analysis target data is included.

2. The analysis apparatus according to claim 1, wherein the processor configured to acquire each piece of analysis target data other than the specified analysis target data among the second analysis target data from the plurality of edges.

3. The analysis apparatus according to claim 1, wherein each piece of the second analysis target data is acquired from the plurality of edges when it is determined that the specified analysis target data is not included.

4. The analysis apparatus according to claim 1, wherein the processor configured to: acquire the meta information including the first detection position and the first detection time for each of the plurality of pieces of analysis target data from the plurality of edges, and specify the first detection position and the first detection time by referring to the storage unit in which the acquired meta information is stored.

5. The analysis apparatus according to claim 1, wherein the first detection position includes a detection latitude and a detection longitude for each piece of the first analysis target data, and the first range includes a range of the detection latitude and a range of the detection longitude.

6. The analysis apparatus according to claim 1, wherein the first range of the first detection position and the second range of first detection time for each piece of analysis target data included in a combination of analysis target data, in which the correlation coefficient is equal to or greater than a predetermined threshold value, among the first analysis target data are specified.

7. The analysis apparatus according to claim 1, wherein the processor configured to: allocate the first analysis target data to a plurality of groups based on at least one of the first detection position and the first detection time, calculate the correlation coefficient for each piece of the first analysis target data included in the plurality of groups, specify the first range and the second range for each piece of the first analysis target data included in the plurality of groups, and determine whether the specified analysis target data in which the second detection position is included in any one of the first ranges for each of the plurality of groups and the second detection time corresponds to any one of the second ranges for each of the plurality of groups is included in the second analysis target data.

8. An analysis method performed by a computer, the method comprising:
acquiring a plurality of pieces of analysis target data collected at a plurality of edges;
determining first analysis target data satisfying a first condition from among the plurality of pieces of analysis target data;
specifying a first detection position indicating a position at which each piece of the determined first analysis target data is detected at the plurality of edges and a first detection time indicating a time when each piece of the determined first analysis target data is detected at the plurality of edges by referring to a storage that stores meta information corresponding to the plurality of pieces of analysis target data;
acquiring a feature amount corresponding to each piece of the first analysis target data from the plurality of edges;
calculating a correlation coefficient of the feature amount between respective pieces of analysis target data included in the first analysis target data;
specifying a first range of the first detection position and a second range of the first detection time of the analysis target data for which the calculated correlation coefficient satisfies a predetermined relationship, from among the first analysis target data;
determining second analysis target data which satisfies a second condition from among the plurality of pieces of analysis target data;
specifying a second detection position and a second detection time corresponding to the determined second analysis target data by referring to the storage;
determining whether specific analysis target data in which the specified second detection position is included in the first range and the specified second detection time corresponds to the second range is included in the second analysis target data; and
acquiring any one piece of the specific analysis target data from the plurality of edges when it is determined that the specific analysis target data is included.

9. A non-transitory computer-readable storage medium storing a program that causes a computer to execute a process, the process comprising:

acquiring a plurality of pieces of analysis target data collected at a plurality of edges;

determining first analysis target data satisfying a first condition from among the plurality of pieces of analysis target data;

specifying a first detection position indicating a position at which each piece of the determined first analysis target data is detected at the plurality of edges and a first detection time indicating a time when each piece of the determined first analysis target data is detected at the plurality of edges by referring to a storage that stores meta information corresponding to the plurality of pieces of analysis target data;

acquiring a feature amount corresponding to each piece of the first analysis target data from the plurality of edges;

calculating a correlation coefficient of the feature amount between respective pieces of analysis target data included in the first analysis target data;

specifying a first range of the first detection position and a second range of the first detection time of the analysis target data for which the calculated correlation coefficient satisfies a predetermined relationship, from among the first analysis target data;

determining second analysis target data which satisfies a second condition from among the plurality of pieces of analysis target data;

specifying a second detection position and a second detection time corresponding to the determined second analysis target data by referring to the storage;

determining whether specific analysis target data in which the specified second detection position is included in the first range and the specified second detection time corresponds to the second range is included in the second analysis target data; and acquiring any one piece of the specific analysis target data from the plurality of edges when it is determined that the specific analysis target data is included.

* * * * *